United States Patent
Bracha et al.

(10) Patent No.: US 6,393,491 B1
(45) Date of Patent: May 21, 2002

(54) METHOD AND APPARATUS FOR DISPATCH TABLE CONSTRUCTION

(75) Inventors: Gilad Bracha, Los Altos; Deepa Viswanathan, Cupertino, both of CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/299,946

(22) Filed: Apr. 26, 1999

(51) Int. Cl.$^7$ .............................................. G06F 9/44
(52) U.S. Cl. ..................................................... 709/315
(58) Field of Search ................................ 709/310–332; 717/1–10, 100–167; 711/163

(56) References Cited

U.S. PATENT DOCUMENTS

| | | | | |
|---|---|---|---|---|
| 4,525,780 A | * | 6/1985 | Bratt et al. ................. | 711/163 |
| 5,546,586 A | * | 8/1996 | Wetmore et al. ............ | 717/122 |
| 5,790,860 A | * | 8/1998 | Wetmore et al. ............ | 717/122 |
| 6,260,187 B1 | * | 7/2001 | Cirne ......................... | 717/110 |
| 6,311,227 B1 | * | 10/2001 | Tabuchi ....................... | 709/316 |

* cited by examiner

Primary Examiner—St. John Courtenay, III
(74) Attorney, Agent, or Firm—Beyer, Weaver & Thomas, LLP

(57) ABSTRACT

Apparatus, and computer program products are disclosed for constructing dispatch tables. In one embodiment of the present invention, the decision to allocate a new dispatch table entry is sensitive to the accessibility of a class. A dispatch table and dispatch table construction process is described in which the entries for a Vtable are determined such that conflicts between accessibility and class hierarchy are avoided. In particular, a dispatch table and dispatch table construction process is described which takes a method's accessibility and package status into consideration in determining the proper overriding semantics and table building techniques. The dispatch table may have more than one distinct entry for a method.

18 Claims, 17 Drawing Sheets

METHOD AND APPARATUS FOR DISPATCH TABLE CONSTRUCTION

FIELD OF THE INVENTION

The present invention relates generally to the field of computer software and software portability. In particular, it relates to the construction dispatch tables.

BACKGROUND OF THE INVENTION

To facilitate the following discussion, a brief overview of a conventional object oriented computing environment will be given. In an object oriented computing environment, an object refers to a software bundle of variables and related methods. An object maintains its state, i.e., what the object knows, in variables, and implements its behavior, i.e. what the object can do, in methods. Messages are the means by which software objects interact and communicate with each other. Collectively, variables and methods may be referred to as members. The variables and methods for an object are also referred to as instance variables and instance methods.

Typically, class variables and class methods are those variables and methods defined as belonging to a class. A class may be described as a reusable blueprint that defines the variables and the methods common to all objects of a certain kind. An instance is an object belonging to a class where memory is allocated for the instance variables in the class.

Classes may be arranged in a class hierarchy, or inheritance tree, in which the further down the hierarchy a class appears, the more specialized it is. FIG. 1 is a block diagram representing a particular class hierarchy 100. The class hierarchy 100 includes a Class A 102 including variables 104 and methods 106. In the illustrated embodiment, Class A has a plurality of associated methods, including method M. The class hierarchy further includes Class B 110 which inherits from Class A, and Classes C, D and E (112,114 and 116 respectively), which all inherit from Class B 110. Each of the subclasses also include variables 104 and methods 106.

A superclass refers to the class' direct ancestor as well as to all of its ascendant classes. A 'direct' superclass distinguishes the immediate parent superclass from the alternate ascendant superclasses in a class hierarchy. A subclass provides specialized behavior apart from the basis of common elements provided by the superclass. To do this, each subclass inherits variables and methods from the superclass. In addition, subclasses can add variables and methods to the ones they inherit from the superclass. For example, the class B 110 inherits accessible methods defined in its superclass (class A 102), including the method M 108. Class B may also define its own new methods, including method N, 109 in the embodiment shown. It is important to note that subclasses can also override one or more of its inherited methods and provide specialized implementations for those methods.

When a language allows classes to inherit from a single superclass, it is said to have a single inheritance. In contrast, when a language allows classes to inherit from more than one superclass, it is said to have multiple inheritance. In the class hierarchy illustrated in FIG. 1 there is single inheritance since each subclass inherits from just one direct superclass.

In some languages, a superclass may be repetitively used through the practice of inheritance. Generally, a subclass inherits all of the methods from its superclass that are accessible to that subclass as they are unless the subclass explicitly overrides a method. Accessibility is determined by a combination of an accessibility declaration of the superclass member and an accessibility, declaration of the subclass member.

Accessibility is differentiated to facilitate a spectrum from unrestricted sharing of source code to specific forms of privacy. The two conventional types of accessibility levels are public and private. A public member can be seen or accessed by any other class. A private member can only be accessed by its own class. Particular languages may use additional accessibility types. For example, C++ uses a protected accessibility in which a protected member can generally only be accessed by its subclasses. Additionally, Java uses a package private accessibility in which a package private member can only be accessed by classes in a particular package. A package is a collection of related classes and interfaces that provide access protection and namespace management for all the elements of the package. Classes may be grouped into packages to make classes easier to find and use, to avoid naming conflicts, and to control access.

Generally, the accessibility of a message is specified upon declaration of the member. If no accessibility is initially provided, a default accessibility may be used. For example, within a Java package, the default accessibility for a member whose accessibility is not initially specified becomes package private.

FIG. 2 is a block diagram describing a class hierarchy, wherein each class in the hierarchy locally defines a method "foo". Specifically, class A 202 belongs to a Package P1 and contains a method 'A.foo' 204 having an unspecified accessibility. In this case, the method A.foo 204 is defaulted to a package private accessibility with respect to Package P1. Similarly, class B 206 belongs to a Package P2 and contains a method 'B.foo' 208 having a public accessibility. Class C 210 belongs to a Package P1 and contains a method 'C.foo' 212 having a public accessibility. The methods 204, 208 and 212 all implement the method "foo", however, what differs between the three is their respective class, package, source code and accessibility. This difference may affect the behavior of the method, e.g. if the method calls source code for a print statement to announce the method's class, the three methods will have different outputs as illustrated.

Conventionally, every class and interface has a method table containing all the methods it locally defines. In addition, every class has a dispatch table, or Vtable, that has entries for all externally accessible methods that can be invoked by the class, including inherited methods. Typically private methods are not included in the Vtable. In conventional Vtable construction, every externally accessible method is associated with a single Vtable entry, which points to a section of code corresponding to a method. Thus, every Vtable entry points back at a method it corresponds to, whether local or inherited.

FIG. 3 is a block diagram illustrating a conventional format of a Vtable 300 corresponding to class B 206 of FIG. 2. The Vtable 300 includes a superclass portion 302 which contains all the entries corresponding to methods inherited from the direct superclass (class A 202) and a class portion 304 which contains the entries corresponding to the methods locally defined in class B 206. The locally defined methods found in the class portion 304 are those which are new to class B 206. For example, a new entry 306 which did not over-write an entry corresponding to a method from class A 202 is added in the class portion 304 and thus increases the size of the Vtable 300. Alternately, locally defined methods that override a corresponding superclass method overwrite the existing Vtable entry in the superclass portion 302. For example, an entry 308 of Vtable 300 which points to code for B.foo overwrites the corresponding entry in the superclass portion of Vtable 300 to point to the code for the locally defined method C.foo.

The Java programming language contemplates the use of single inheritance. In Java, a subclass is defined to inherit all of the accessible members of its superclass and ancestors and can use these members as is, hide them or override them. Subclasses inherit those superclass members declared as public or protected. In addition, subclasses inherit a superclasses' members declared with no access designation as long as the subclass is in the same package as the superclass (i.e. they both default to package private). Thus, Java flexibly provides an accessibility spectrum from unrestricted sharing of source code to controllable levels of privacy. Conventional Vtable construction based on a diametric scheme for inheritance does not permit this accessibility spectrum.

In view of the foregoing, it should be apparent that improved dispatch table construction techniques would be desirable.

SUMMARY OF THE INVENTION

According to the present invention, methods, apparatus, and computer program products are disclosed for constructing dispatch tables. In one embodiment of the present invention, the decision to allocate a new dispatch tables entry is sensitive to accessibility. In another embodiment, a Vtable is provided wherein a method in the Vtable has more than one entry.

The invention relates in accordance with one embodiment to a process of building a dispatch table for methods in a class that inherits from a single superclass. The process includes copying a dispatch table for a superclass. The process also includes determining whether a selected method in the class also exists in an ancestor superclass of the class. The process further includes determining whether a selected superclass version of the selected method is accessible when it is determined that the selected method also exists in an ancestor superclass that the first class inherits from. The process additionally includes creating a new entry in the dispatch table for the selected method in the first class when it is determined that the selected superclass version of the selected method is not accessible. The process also includes overwriting an entry when it is determined that the selected method in the first class is accessible. When no superclass version of the method exists, a new entry for the method is created.

In another embodiment, the invention relates to a process of building a dispatch table for methods in a class that inherits from a direct superclass in an ascendant hierarchy. The process includes copying a dispatch table from a superclass. The process also includes determining whether a selected method and accessibility in the class also exist in a superclass of the ascendant hierarchy. The process further includes assigning an index to an entry of the dispatch table.

In yet another embodiment, the invention relates to a dispatch table for a class that inherits from at least one superclass, the dispatch table including a plurality of entries for a particular method.

BRIEF DESCRIPTION OF THE DRAWINGS

The invention will be better understood by reference to the following description taken in conjunction with the accompanying drawings in which.

DETAILED DESCRIPTION

Reference will now be made in detail to a specific embodiment of the invention. An example of this embodiment is illustrated in the accompanying drawings. While the invention will be described in conjunction with a specific embodiment, it will be understood that it is not intended to limit the invention to one embodiment. To the contrary, it is intended to cover alternatives, modifications, and equivalents as may be included within the spirit and scope of the invention as defined by the appended claims.

A dispatch table and dispatch table construction process is described in which the entries for a Vtable are determined such that conflicts between accessibility and class hierarchy are avoided. In particular, a dispatch table and dispatch table construction process is described which takes a method's accessibility into consideration in determining the proper overriding semantics and table structure. The dispatch table may have more than one distinct entry for a method. To avoid improper handling of methods, the entries to be overriden must be determined. In some cases, even though a method overrides a superclass method, a new Vtable entry must still be produced.

In the described Java embodiment, four distinct accessibility designations are provided. Correspondingly, multiple searches up at least a portion of the superclass hierarchy may be performed for each designation. The search up the ascendant hierarchy ceases when all the accessibilities have been found in a superclass. As a class may also inherit from a superinterface, the semantic interactions encountered between class hierarchies and accessibilities also occur in the interface hierarchy.

Additionally, each of the multiple entries for a particular method in a Vtable may be assigned a priority for the particular method in a class. Typically, the entry including the same accessibility designation as the accessibility of the method is assigned as the primary entry. The primary entry is typically invoked when the particular method is declared. In addition, a secondary and tertiary entry may also exist in the Vtable for the particular method corresponding to different accessibility designations.

In general, the decision to allocate a new Vtable entry is now sensitive to the accessibility of the method. It may also depend on the accessibility of an overriden method. For example, a public or protected method needs a new Vtable entry only if no public or protected method was overriden. Otherwise, the Vtable index of the overriden public/protected method is used. Similarly, a package private method needs a new Vtable entry only if no package private method from the same package was overriden. A private entry always needs a new Vtable entry. Thus, the process of updating the Vtable entries for new and overriden methods is case dependent in that a method may use as many as three Vtable entries which all must be set appropriately.

Figure 1:
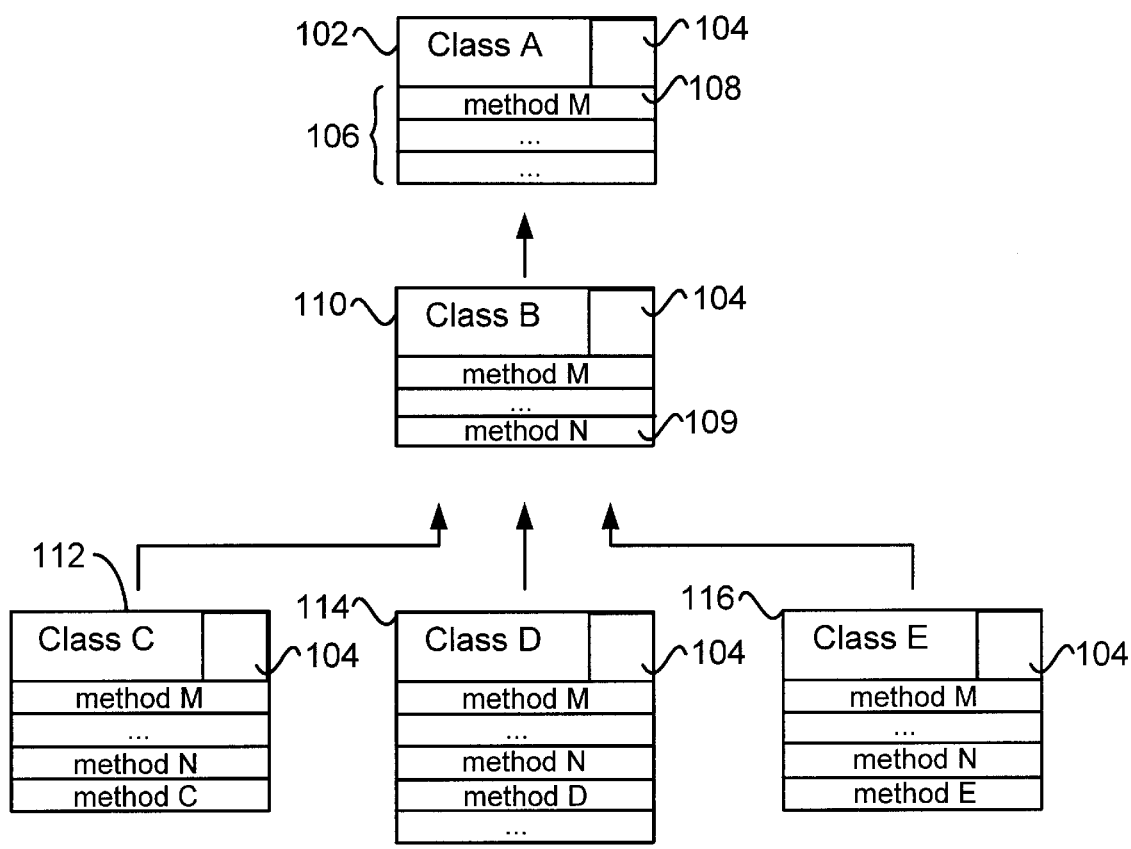
FIG. 1 is a block diagram describing a typical format of a class hierarchy.
Figure 2:
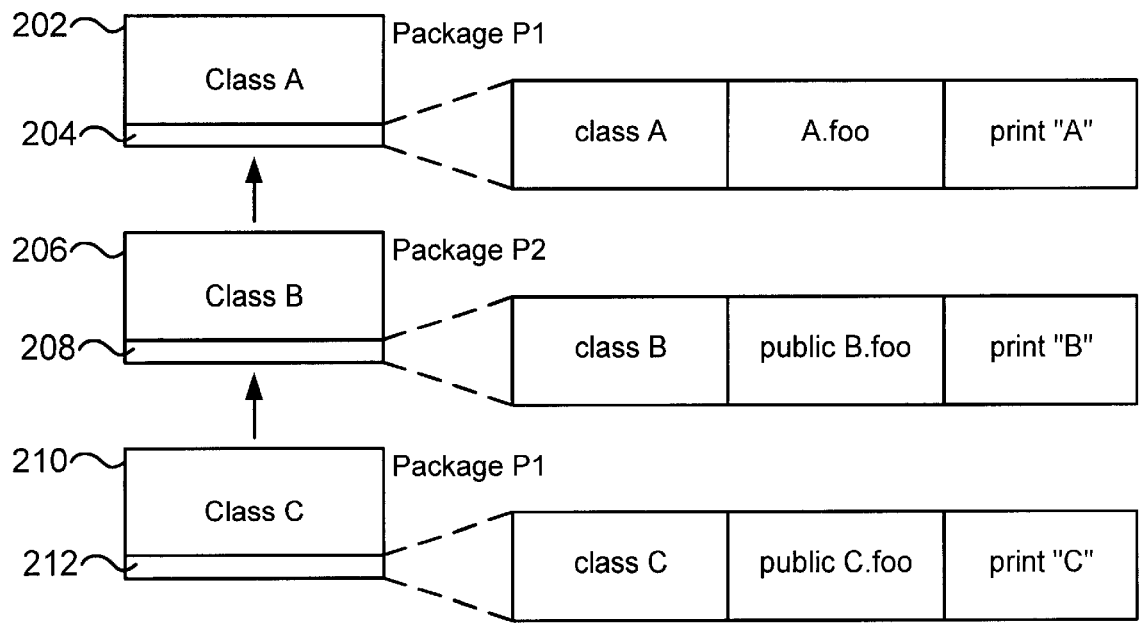
FIG. 2 is a block diagram describing a class hierarchy including a particular method foo which is separately defined in each respective class.
Figure 3:
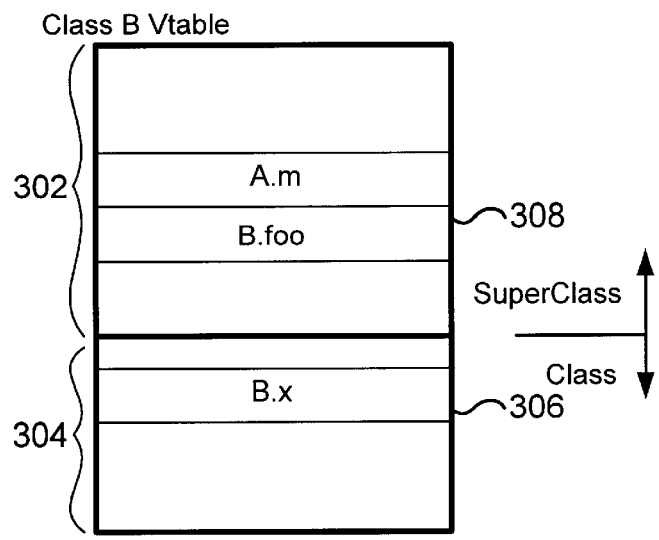
FIG. 3 illustrate a conventional format of a Vtable corresponding to class B of FIG. 2.
Figure 4:
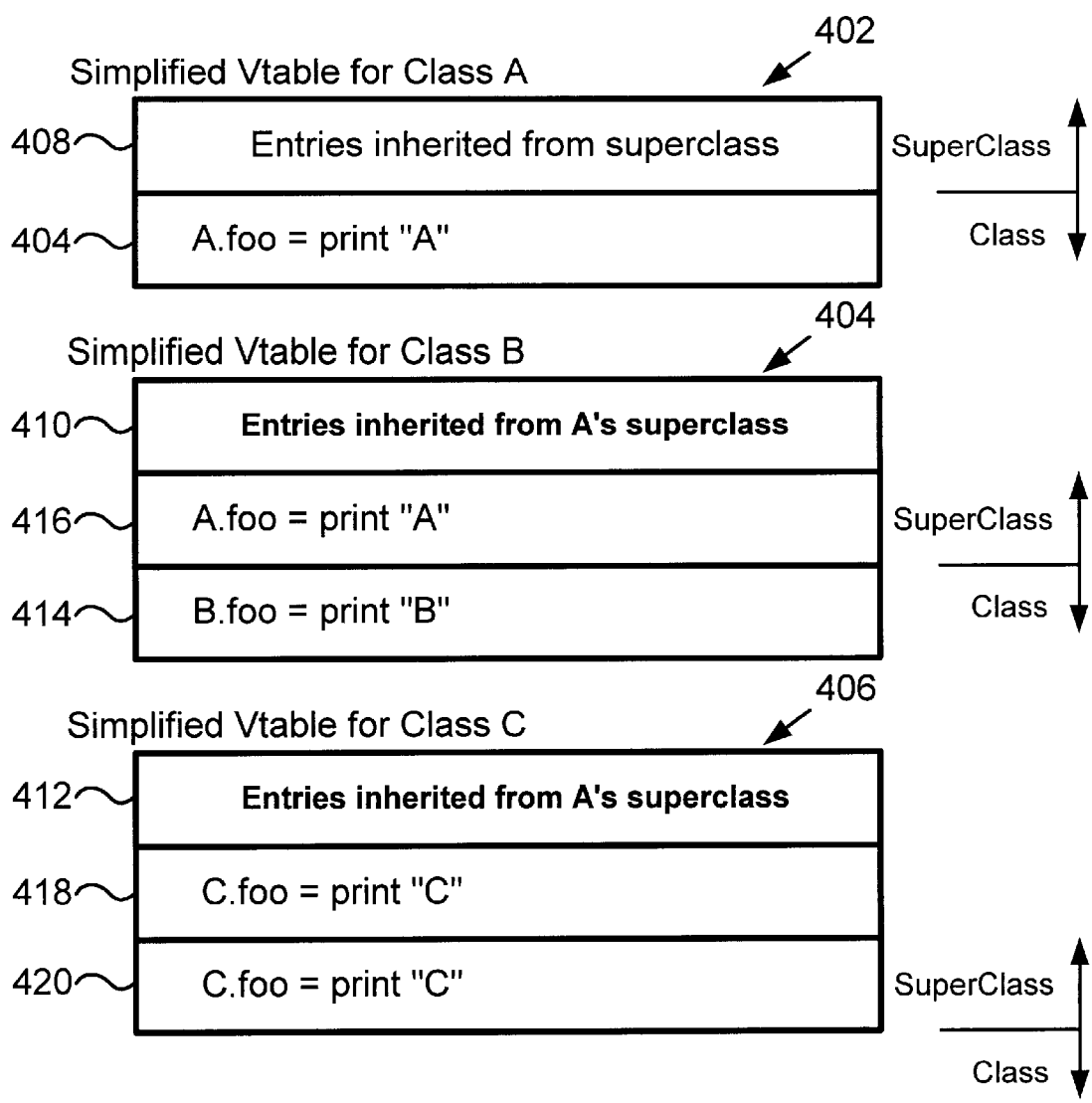
FIG. 4 is a set of simplified Vtables corresponding to the classes of FIG. 2 in accordance with one embodiment of the present invention.

The rules for Vtable construction in accordance with one embodiment of the present invention will be described with reference to FIG. 4 which illustrates simplified Vtables 402, 404 and 406 for class A 202, class B 206 and class C 210 of FIG. 2 respectively. Typically, each Vtable includes a number of inherited entries represented by portions 408, 410 and 412 respectively in each Vtable. As seen in FIG. 2, for the purposes of this illustration it is assumed that classes A, B and C each locally define a method "foo". Class A belongs to Package P1 and method A.foo is defined as package private. Class B belongs to Package P2 and method B.foo is public. Class C belongs to Package P1 (like Class A) and method C.foo is public.

In the construction of the Vtables corresponding to classes A, B and C, it must be determined whether the locally defined "foo" method will require a new Vtable entry or whether it will require overwriting one or more corresponding entries in the superclass portion of the Vtable. This determination is made simply on the basis of whether the superclass versions of the method "foo" are accessible to the class. Any Vtable entries corresponding to versions of the method that are accessible are overwritten. If none of the superclass entries corresponding to method "foo" correspond to methods that are accessible to the class, a new Vtable entry is created.

By way of example, consider the construction of the Vtable for class B. First, the Vtable of its superclass (in this case class A) will be copied. Since class B locally defines a method B.foo, a decision must be made as to whether to overwrite the Vtable entry for A.foo or to make a new entry to the Vtable. As pointed out above, the method 204 of class A 202 is package private with respect to Package P1 and therefore inaccessible to the method 208 of class B 206 since class B is in Package P2 (as opposed to Package P1). Therefore, a new entry 414 corresponding to the method 208 of class B 206 will be provided in the Vtable for class B 404. Thus, the Vtable for class B now has two entries corresponding to "foo" methods. The first entry is the original entry 416 corresponding to the method A. foo. The second entry is the new entry 414 corresponding to B.foo. That is, a new entry 414 corresponding to B.foo is added to the Vtable 404. With this arrangement, when the method "foo" is called for an instance of class B, the Vtable for the instance of class B 404 will return the B.foo entry 414 which corresponds to the appropriate method 208 for class B 206.

Next consider the construction of the Vtable for class C. As mentioned before, class C 210 inherits all the methods of its direct superclass, i.e. class B 206. Accordingly, the Vtable for class C contains all the entries from the Vtable of its direct superclass (in this case Class B 404) including the entries 414 and 416 determined previously. In the sample illustrated, class C is part of Package P1 (like class A, but not class B) and also locally defines a "foo" method (referred to herein as C.foo). As previously mentioned, any preexisting versions of method "foo" are accessible to class C will be overriden and any preexisting versions of method "foo" which are inaccessible cannot be overriden. In this case, the method 208 of class B 206 is public and accessible to the method 212 of class C 210. Accordingly, in the Vtable 406 for class C, an entry 420 corresponding to method 208 of class B 206 will be overwritten to reference C.foo. In addition, the method 204 of class A 202 is package private with respect to Package P1 and is also accessible to class C 210 since both classes A and C are within the same package (Package P1). Accordingly, in the Vtable 406 for class C, an entry 418 corresponding to method 204 of class A 202 will also be overwritten to reference C.foo. Thus, C.foo is referenced twice in the same Vtable. With this arrangement, when the method "foo" is called for an instance of class C, the Vtable for the instance will return the C.foo entry.

Figure 5:
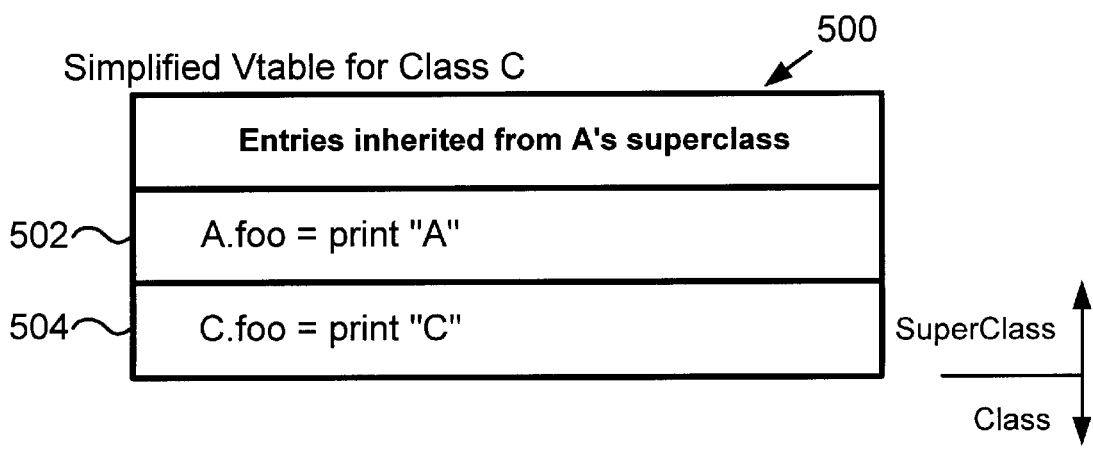
FIG. 5 is a simplified Vtable corresponding to class C of FIG. 2 in accordance with another embodiment of the present invention.

Referring next to FIG. 5, a second example will be described. In this example, the class hierarchy and method accessability of FIG. 2 are retained, with the one exception that class C is defined to be part of a third package, Package P3 (rather then Package P1 as in the example of FIG. 4). In the construction of the Vtable corresponding to this class C, the method 208 of class B 210 remains accessible to class C. Accordingly, the Vtable entry corresponding to method B.foo will (like the previous case) be overwritten by an entry 504 corresponding to C.foo. However, the method A.foo is package private with respect to Package P1 and now inaccessible to class C which is part of Package P3. Accordingly, entry 502 will not be overwritten in the Vtable 500 for class C.

Another noteworthy rule commonly found in object oriented languages is that the publicity of a method cannot be decreased after the publicity has been established, i.e. the accessibility cannot be diminished. In this manner, a subclass can always be used where its superclass is expected, i.e. an inherited public method cannot be converted into a private method.

Figure 6:
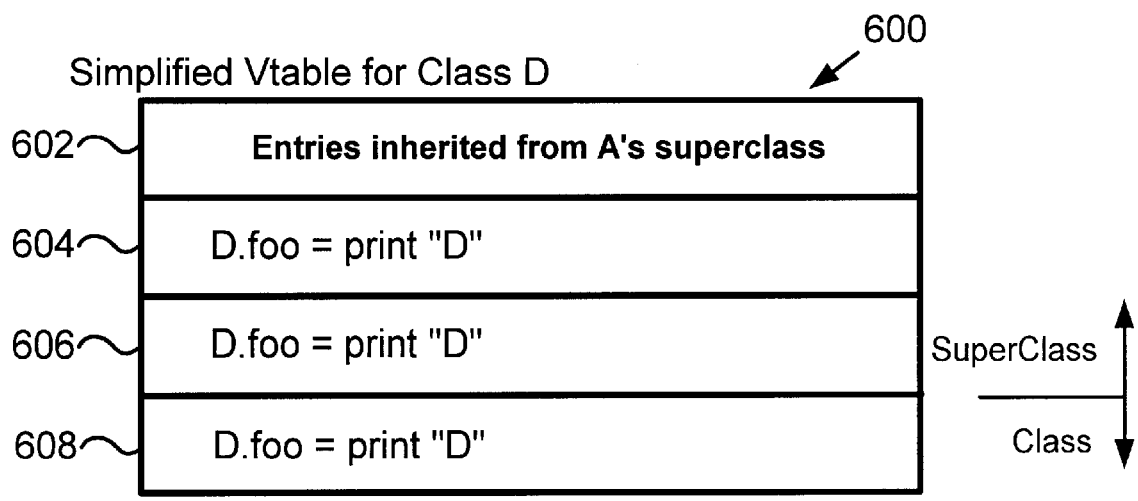
FIG. 6 is a simplified Vtable for class D that inherits from class C of FIG. 4 in accordance with another embodiment of the present invention.

FIG. 6 illustrates an example of building a Vtable 600 for a subclass of class C 210, D, which is private and belongs to Package P1. The Vtable 600 for class D inherits all the methods of its direct superclass, i.e. class C 210 of FIG. 2. Accordingly, it contains all the entries of its direct superclass (which in this case is Vtable 406 for class C 210 of FIG. 4. The construction of the Vtable 600 for class D is done similarly to the construction of the previously described Vtables. The method 212 of class C is public and accessible to class D. Thus, the entry 606 is overwritten so that it refers to the method D.foo. Further, the method 204 of class A 202 is package private with respect to Package P1 and accessible to the method of class D which belongs to Package P1. This method resides in entry 604 and is similarly overriden. Finally, the method "foo" locally defined in instance D (i.e. D.foo) is private and a new entry 608 is created to reflect that entry. Thus, three entries now exist in the Vtable 600 for the same method "foo." The process for creating the improved Vtable 600 will be described in some detail below with respect to FIGS. 8–13.

Similar to the class and superclass hierarchy, there also exits an independent interface hierarchy. Generally, an interface is a mechanism which possibly unrelated objects use to interact with one another. In order to do this in an object oriented language, an interface includes a set of method signatures. Typically, there is no code associated with the method signatures. A class that implements an interface agrees to implement all of the methods defined in the interface and thereby agrees to certain behavior.

An abstract class defines generic behaviors and may partially implement these methods but much of the class is undefined and unimplemented. This unfilled designation allows individual implementations to complete the details (i.e. code) for specialized subclasses. An abstract class may contain a declaration which specifies its status which the compiler will recognize. When an interface is implemented, and the class is abstract, the compiler will allow inheritance of the unspecified methods from the interface. However, if the class is not an abstract class, the compiler will insist that the unspecified methods are filled. These methods inherited from a superinterface which are not complete in their definition in the class or any of its superclasses are referred to as 'miranda methods'.

These miranda methods also require an entry as if they were declared in the class. As a class may somewhat similarly inherit from a superinterface, the semantic interactions encountered between class hierarchies and accessibilities may also occur with in the interface hierarchy. A noteworthy difference in the case of the interface hierarchy is that interface methods are generally always public. However, while a class has only one superclass in a single inheritance hierarchy, it may have multiple superinterfaces which will considerably increase the complexity of the system.

In order to handle the abstract methods which when called, should issue an error message for calling a method with no corresponding code, a stub pointer is used in place of the pointer to the method code. This stub points at code that raises an exception. The stub pointer must be in place since abstract methods are common and allow independent designers to design code with respect to the abstract class, thus governing common behavior among the corresponding subclasses.

In a particular embodiment, miranda methods are defined in a class' Vtable but do not appear in the method table of any class. For purposes of building a Vtable, since miniranda methods are not declared by the class, they must be handled separately. In one embodiment of the present invention, a separate Vtable entry is provided for a miranda method.

Any software language which uses accessibility constructs and inheritance of source code may implement the present invention. In a particular embodiment of the present invention, JAVA semantics in dispatch table construction implements the present invention.

Figure 7A:
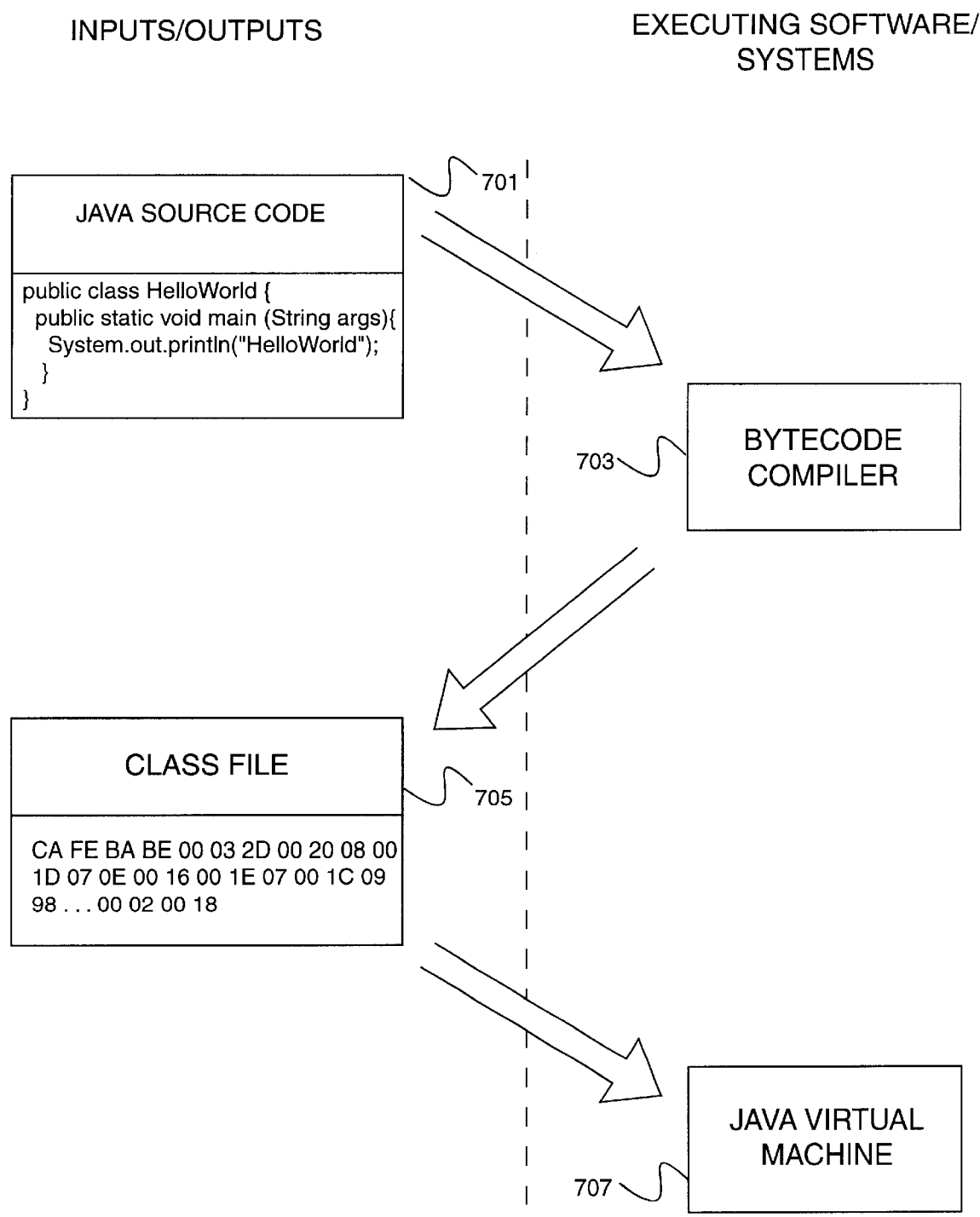
FIG. 7a is a block/process diagram illustrating the transformation of a Java™ program containing Java source code to native code to be run on a particular platform or computer.

FIG. 7a is a block diagram showing the inputs/outputs and the executing software/systems involved in creating native instructions from Java source code in accordance with one embodiment of the present invention. In other embodiments, the present invention can be implemented with a virtual machine for another language or with class files other than Java class files. Beginning with the left side of the diagram, the first input is Java source code 701 written in the Java™ programming language developed by Sun Microsystems of Mountain View, Calif. Java source code 701 is input to a bytecode compiler 703. Bytecode compiler 703 is essentially a program that compiles source code 701 into bytecodes. Bytecodes are contained in one or more Java class files 705. Java class file 705 is portable in that it can execute on any computer that has a Java virtual machine (JVM). Components of a virtual machine are shown in greater detail in FIG. 7B. Java class file 705 is input to a JVM 707. JVM 707 can be on any computer and thus need not be on the same computer that has bytecode compiler 703. JVM 707 can operate in one of several roles, such as an interpreter or a compiler. If it operates as a compiler, it can further operate as a "just in time" (JIT) compiler or as an adaptive compiler. When acting as an interpreter, the JVM 707 interprets each bytecode instruction contained in Java class file 705.

Figure 7B:
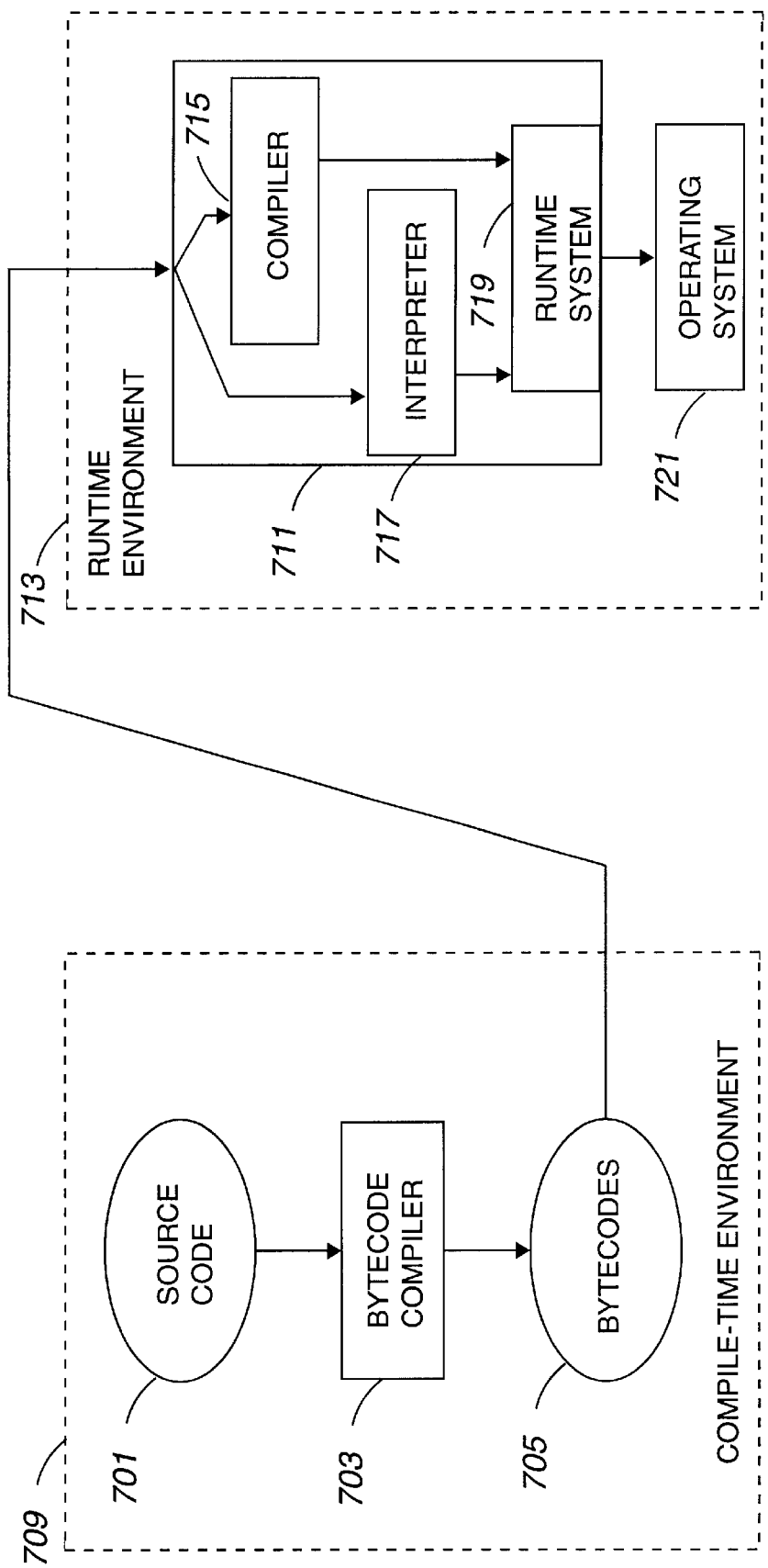
FIG. 7b is a diagrammatic representation of virtual machine, supported by the computer system of FIG. 18 described below.

FIG. 7b is a diagrammatic representation of virtual machine 711 such as JVM 707, that can be supported by computer system 1800 of FIG. 18 described below. As mentioned above, when a computer program, e.g., a program written in the Java™ programming language, is translated from source to bytecodes, source code 701 is provided to a bytecode compiler 703 within a compile-time environment 709. Bytecode compiler 703 translates source code 701 into bytecodes 705. In general, source code 701 is translated into bytecodes 705 after the time source code 701 are created by a software developer.

Figure 18:
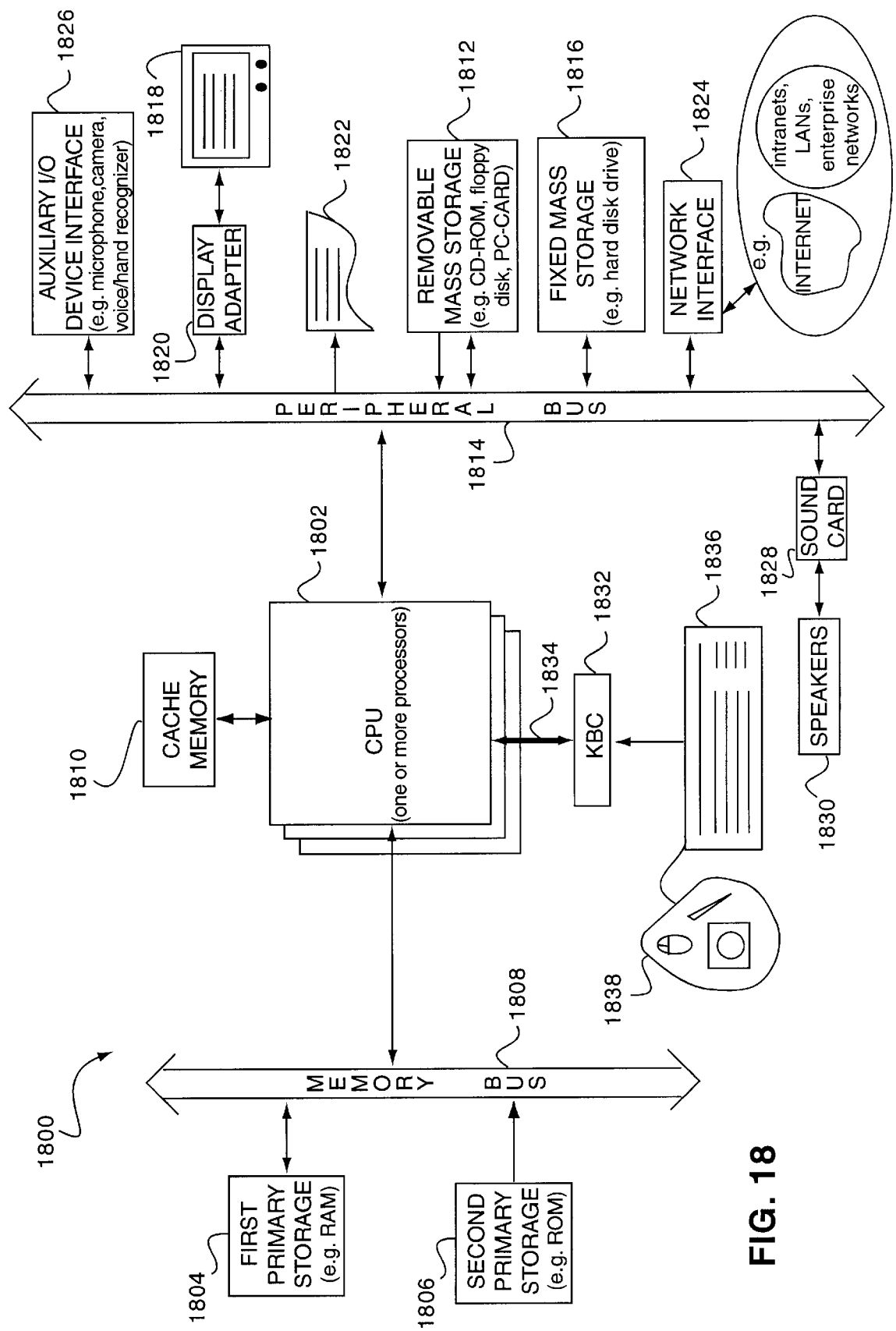
FIG. 18 is a block diagram of a typical computer system suitable for implementing an embodiment of the present invention.

Bytecodes 705 can generally be reproduced, downloaded, or otherwise distributed through a network, e.g., through network interface 1824 of FIG. 18, or stored on a storage device such as primary storage 1804 of FIG. 18. In the described embodiment, bytecodes 703 are platform independent. That is, bytecodes 703 may be executed on substantially any computer system that is running a suitable virtual machine 711. Native instructions formed by compiling bytecodes may be retained for later use by the JVM. In this way the costs of the translation are amortized over multiple executions to provide a speed advantage for native code over interpreted code. By way of example, in a Java™ environment, bytecodes 705 can be executed on a computer system that is running a JVM.

Bytecodes 705 are provided to a runtime environment 713 which includes virtual machine 711. Runtime environment 713 can generally be executed using a processor such as CPU 1002 of FIG. 18. Virtual machine 711 includes a compiler 715, an interpreter 717, and a runtime system 719. Bytecodes 705 can generally be provided either to compiler 715 or interpreter 717.

When bytecodes 705 are provided to compiler 715, methods contained in bytecodes 705 are compiled into native machine instructions (not shown). On the other hand, when bytecodes 705 are provided to interpreter 717, bytecodes 705 are read into interpreter 717 one bytecode at a time. Interpreter 717 then performs the operation defined by each bytecode as each bytecode is read into interpreter 717. In general, interpreter 717 processes bytecodes 705 and performs operations associated with bytecodes 705 substantially continuously.

When a method is called from an operating system 721, if it is determined that the method is to be invoked as an interpreted method, runtime system 719 can obtain the method from interpreter 717. If, on the other hand, it is determined that the method is to be invoked as a compiled method, runtime system 719 activates compiler 715. Compiler 715 then generates native machine instructions from bytecodes 705, and executes the machine-language instructions. In general, the machine-language instructions are discarded when virtual machine 711 terminates. The operation of virtual machines or, more particularly, Java™ virtual machines, is described in more detail in *The Java™ Virtual Machine Specification* by Tim Lindholm and Frank Yellin, $2^{nd}$ Edition (ISBN 0-201-43294-3), which is incorporated herein by reference in its entirety.

FIGS. 8–13 illustrate a dispatch table construction process 800 in accordance with one embodiment of the present invention. The dispatch table is built for a class C in a package P with a direct superclass S. The dispatch table construction process 800 also computes the size of the Vtable, allocates the Vtable and fills it into a suitably sized portion of non-volatile memory.

Figure 8:
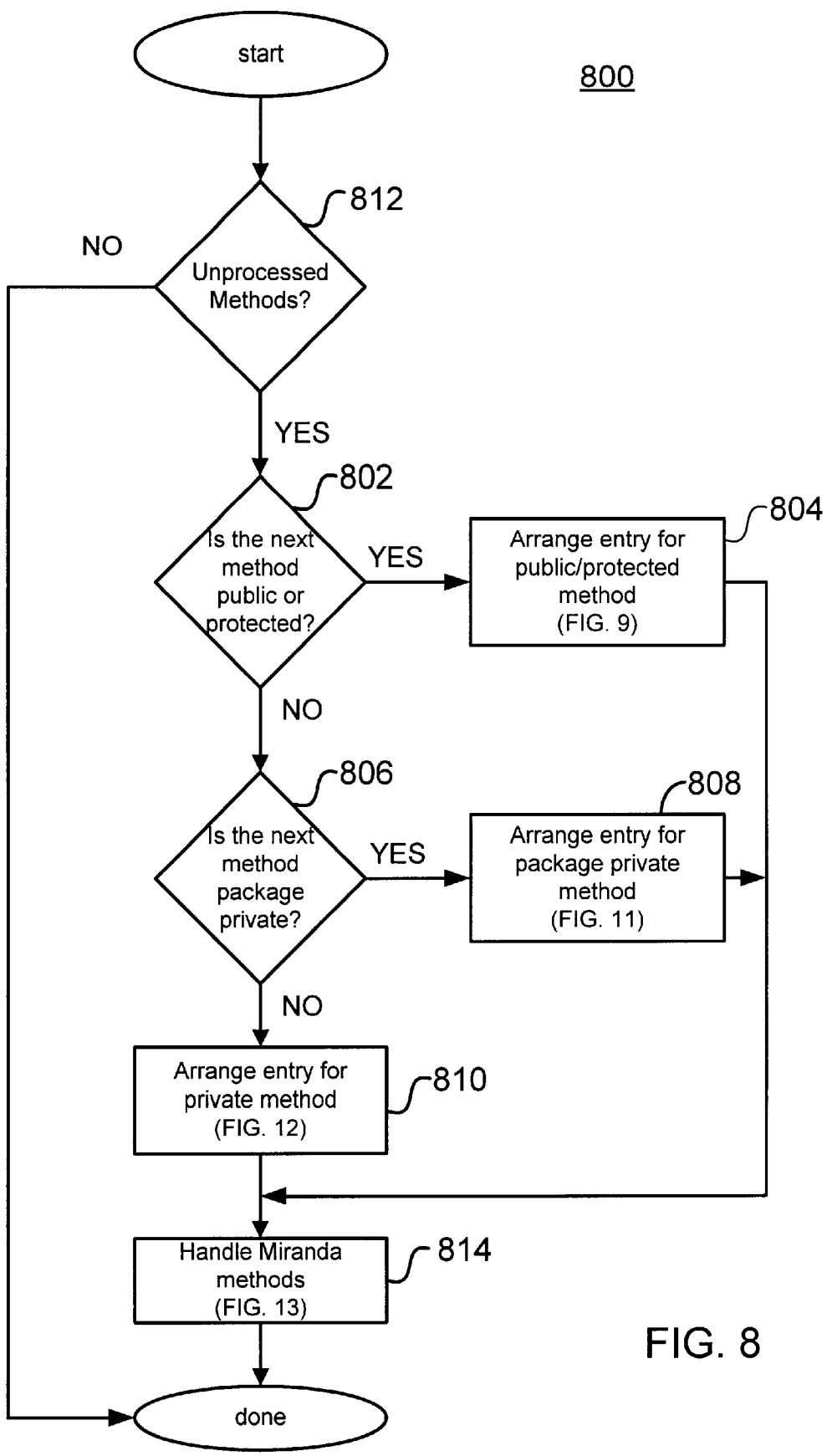
FIG. 8 illustrates a dispatch table construction process in accordance with one embodiment of the present invention.

The dispatch table construction process 800 begins by iterating through all the locally defined methods in the class C (FIG. 8). Correspondingly, the method of the current iteration is called method M. For the purposes of distinguishing accessibility for building the dispatch table, the three groups of accessibility to be determined are public/protected, private and package private. Public and protected are grouped together in the case of FIG. 8 since their behavior in building the dispatch table are substantially similar.

The dispatch table construction process 800 begins by determining if method M is public or protected (802). If it is public or protected, then the process proceeds to arrange the method M according to a public/protected protocol (804) which is described in more detail below with respect to FIG. 9. If not, then the process determines' whether method M is package private (806). If it is package private, then the process proceeds to arrange the method M according to a package private protocol (808) which is described in more detail below with respect to FIG. 11. If not, then the method M is defaulted to a private accessibility and is arranged according to a private protocol (810) which is described in more detail below with respect to FIG. 12. In any of the above cases, when the method M is arranged according to the appropriate manner, the process then determines if there are any unprocessed methods (812) and returns to the beginning for the next method. After all the methods are processed, an additional step is taken to handle any miranda methods if necessary (814), which is described in more detail below with respect to FIG. 13.

Figure 9:
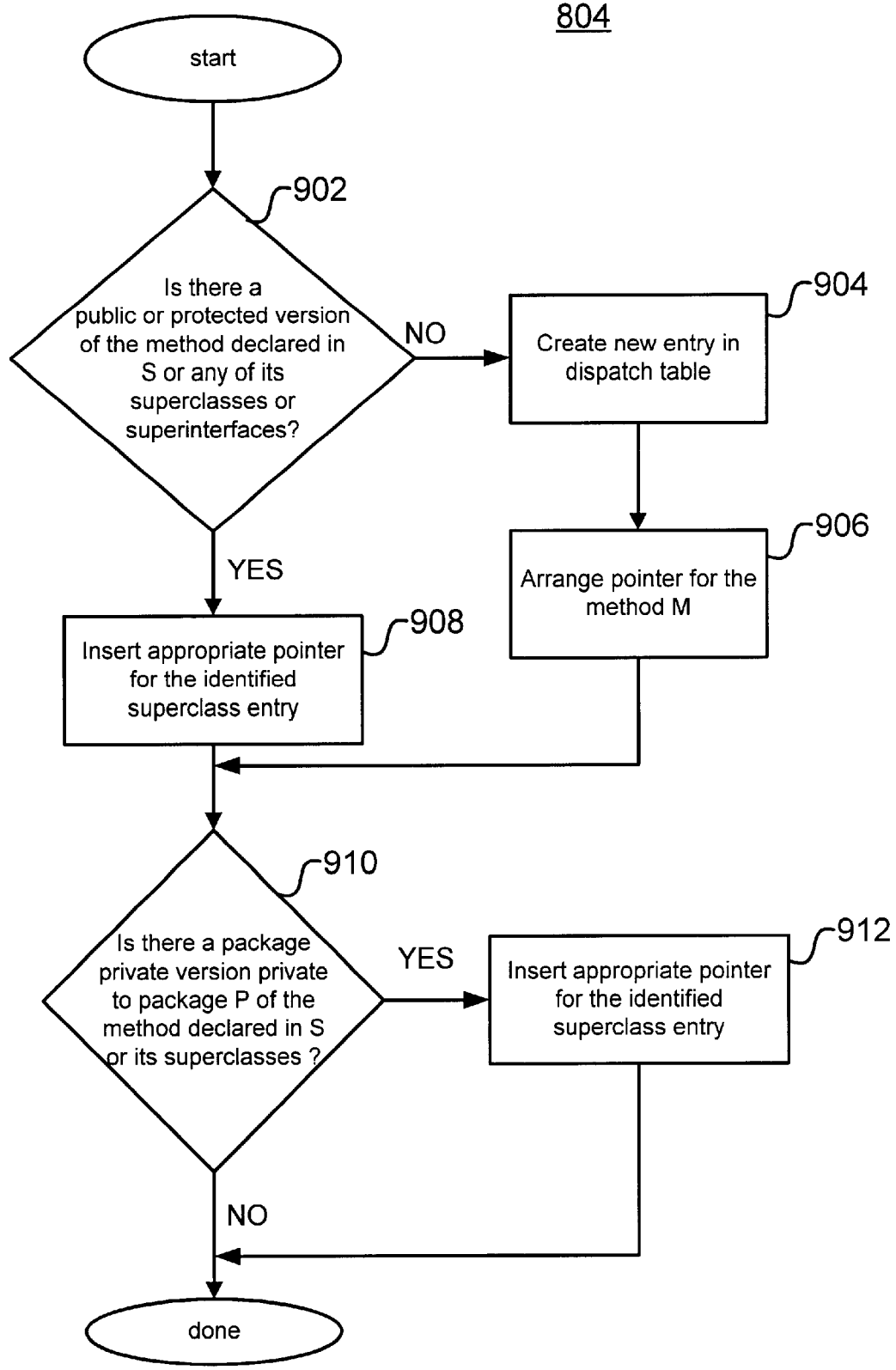
FIG. 9 illustrates a block diagram describing a process for arrange a method M according to public/protected protocol as referred to in step 804 of FIG. 8.

FIG. 9 illustrates a process for arranging the method M in the dispatch table according to public/protected protocol (804). It begins by determining whether there is a public or protected version of method M declared in the direct superclass S or any of the superclass S's superclasses or superinterfaces (902). In other words, the process determines if there exists a version of method M anywhere in the ascendant hierarchy. If the public or protected version of method M does not exist in the ascendant hierarchy, then a new entry is added to the dispatch table (904). Correspondingly, the process inserts the appropriate pointer (1000) for the method M into the newly formed entry (906) which is described in more detail below with respect to FIG. 10. If the public or protected version of method M does exist in the superclass, then the identified superclass entry is overriden by inserting the appropriate pointer (1000) in the identified superclass entry (908) for the dispatch table of class C.

The process 804 also determines if there is an accessible package private (to the package P that the method M corresponds to) version of method M in the ascendant hierarchy (910). If there is, then the identified superclass entry is overriden by inserting the appropriate pointer (1000) for the accessible package private method in the identified superclass entry (912).

Figure 10:
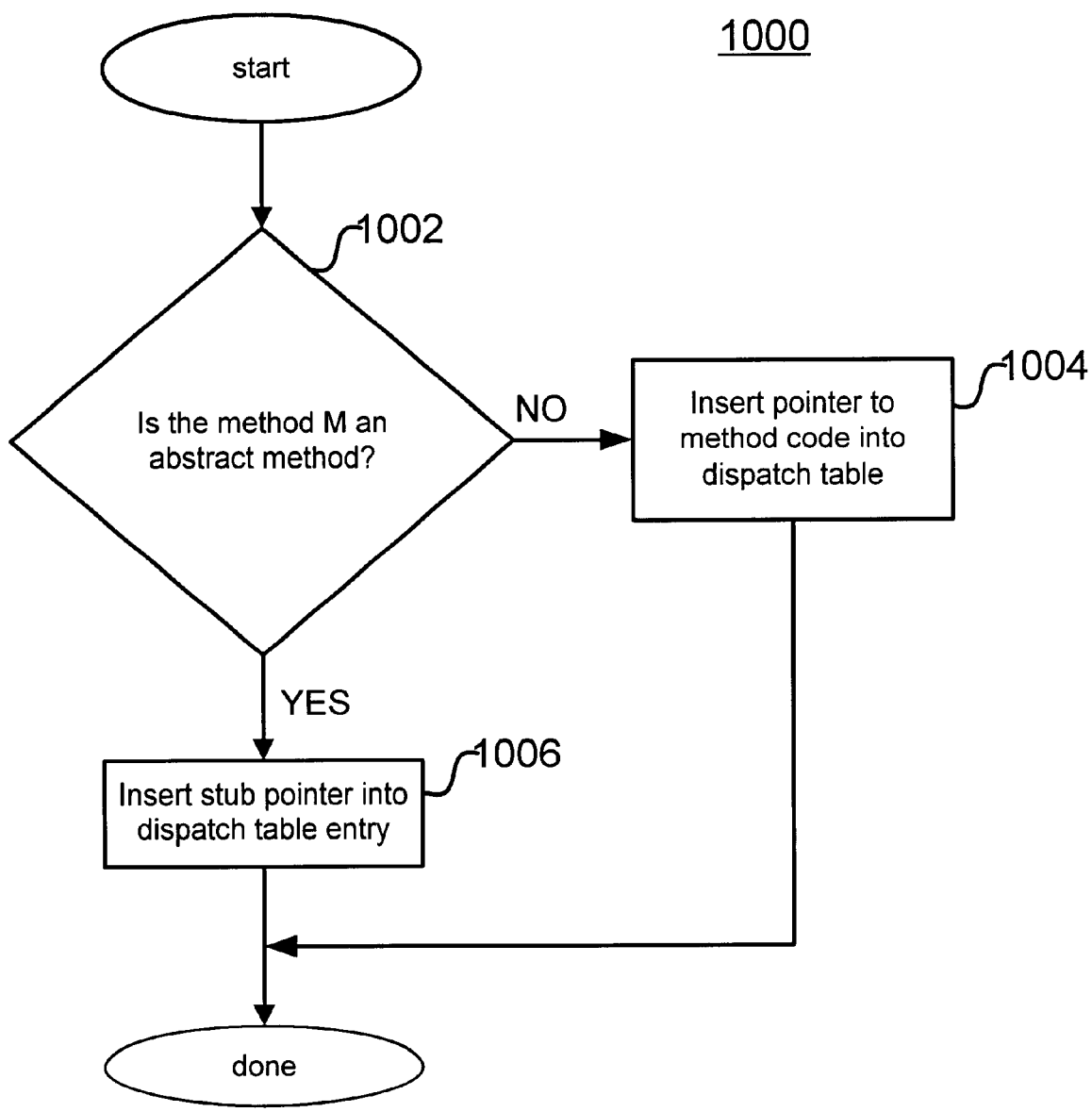
FIG. 10 illustrates a block diagram describing a process for inserting the appropriate pointer to a source code for a method in an entry.

FIG. 10 illustrates a block diagram describing a process for inserting the appropriate pointer to a source code for a method in an entry. (1000). It begins by determining whether the method M is an abstract method (1002). If the method is not an abstract method, then a pointer to the method code is inserted into the appropriate entry of the dispatch table (1006). Alternately, if the method is an abstract method, then a stub pointer is inserted into the appropriate entry of the dispatch table (1006). It is important to note that the insertion of a pointer at this point, either normal or stub, is independent of the existing entry pointer, i.e. a stub pointer is capable of overwriting a pointer to method code.

Figure 11:
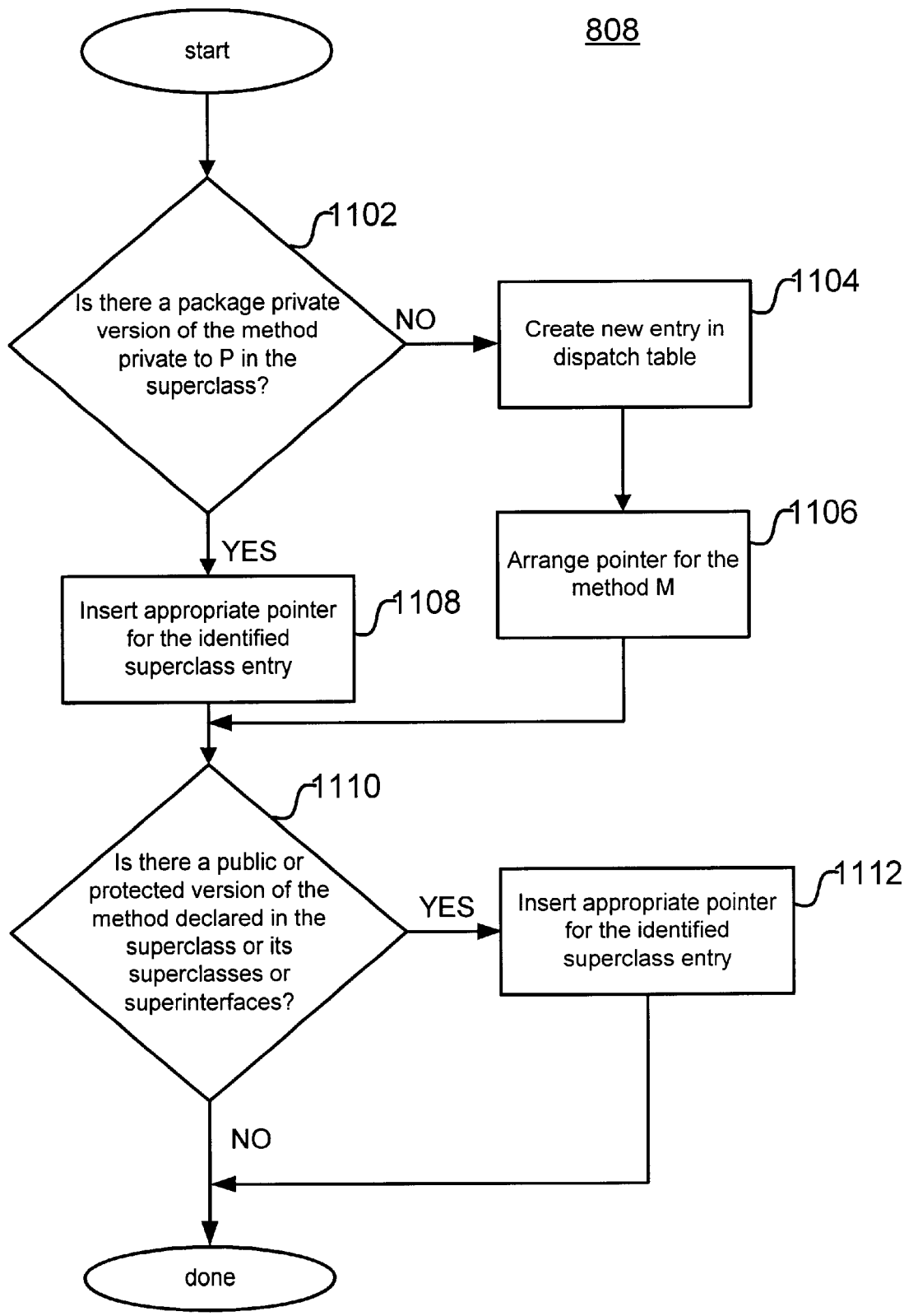
FIG. 11 illustrates a block diagram describing a process for arranging the method M according to package private protocol as referred to in step 808 of FIG. 8.

FIG. 11 illustrates a process for arranging the method M according to package private protocol (808) discussed above with respect to FIG. 8. It begins by determining whether there is an accessible package private version of method M declared in the direct superclass S or any of the superclass S's superclasses or superinterfaces (1102). If the method M having the appropriate package private status (package P in this case) does not exist in the ascendant hierarchy, then a new entry is added to the dispatch table (1104). Correspondingly, the process inserts the appropriate pointer (1000) for the package private version of method M into the newly formed entry (1106). If the package private version of method M does exist in the ascendant hierarchy, then the identified superclass entry is overriden by inserting the appropriate pointer (1000) in the identified superclass entry (1108). The process 808 also determines if there is a public or protected version of method M in the in the direct superclass S or any of the superclass S's superclasses or superinterfaces (1110). If there is, then the identified superclass entry is overriden by inserting the appropriate pointer for the identified public or protected version of method M (1000) in the identified superclass entry (1112).

Figure 12:
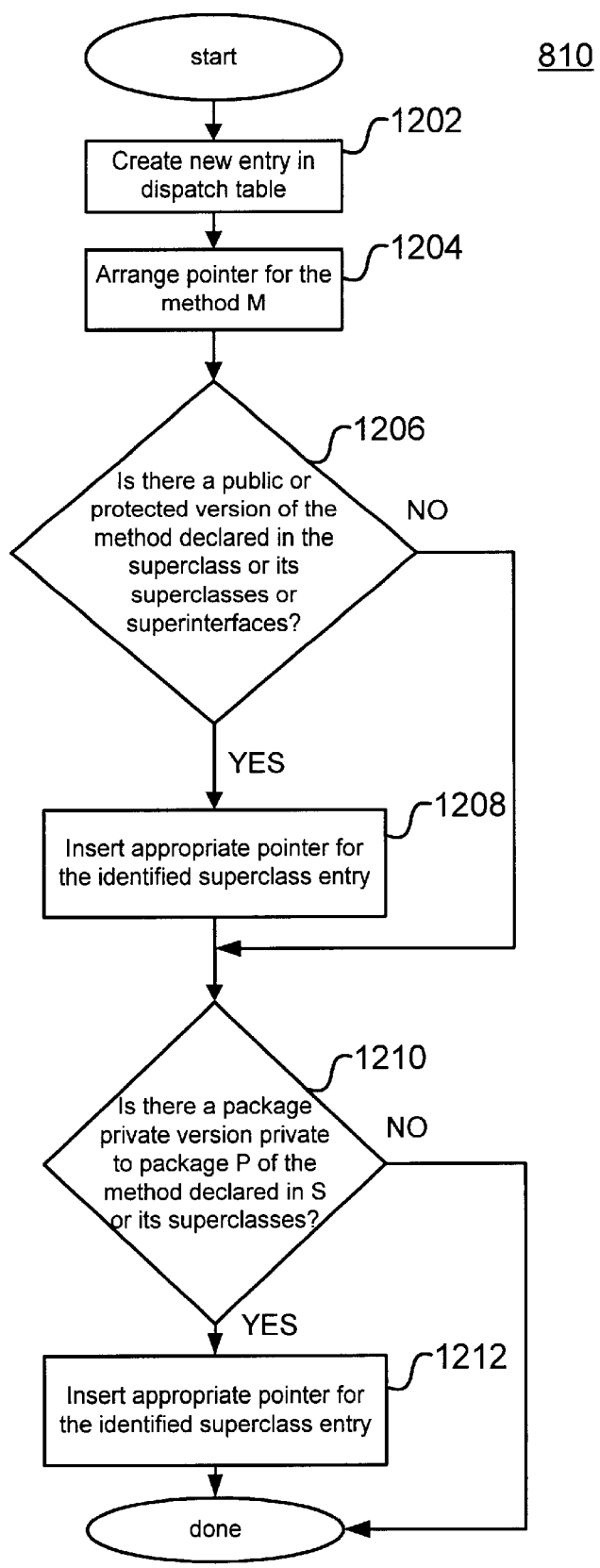
FIG. 12 illustrates a block diagram describing a process for arranging the method M according to private protocol (810) as referred to in step 810 of FIG. 8.

FIG. 12 illustrates a process for arranging the method M according to private protocol (810) discussed above with respect to FIG. 8. It begins adding a new entry to the dispatch table (1202) since a private entry will typically require a new Vtable entry. Correspondingly, the process inserts the appropriate pointer for the private version of method M into the newly formed entry (1204). In this case, it is not necessary to check for an abstract class since the private method since the private method M cannot be abstract.

The process 810 also determines if there is a public or protected version of method M in the in the direct superclass S or any of the superclass S's superclasses or superinterfaces (1206). If there is, then the identified superclass entry is overriden by inserting the appropriate pointer (1000) in the identified superclass entry (1208).

The process 810 further determines if there is a package private version of method M in the in the direct superclass S or any of the superclass S's superclasses (1210). If there is, then the identified superclass entry is overriden by inserting the appropriate pointer (1000) in the identified superclass entry (1212).

Figure 13:
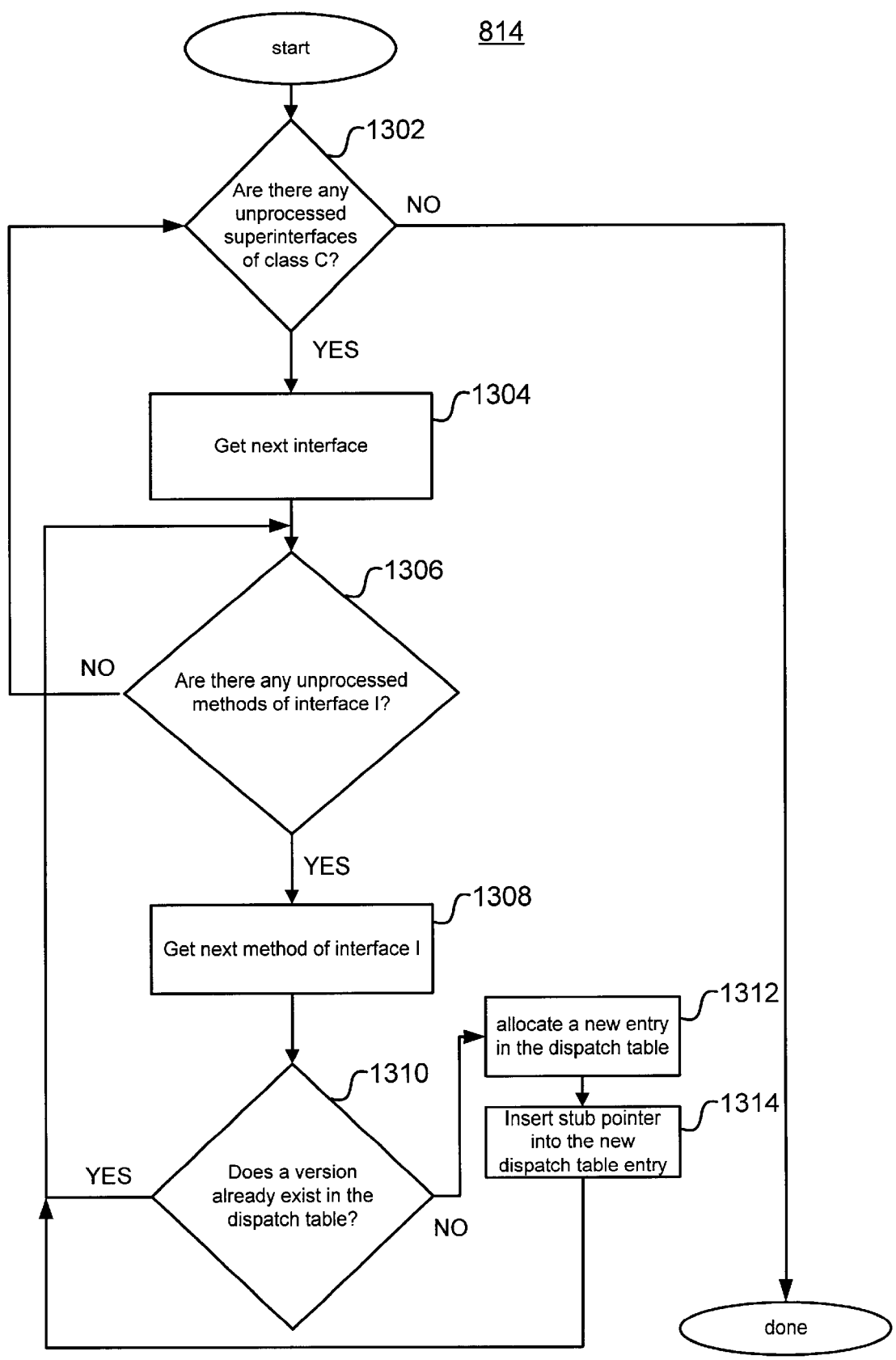
FIG. 13 illustrates a block diagram describing a process for allocating entries in the dispatch table according to miranda method protocol as referred to in step 814 of FIG. 8.

After all the locally defined methods in class C have been arranged in dispatch table construction process 800, any miranda methods must be handled. FIG. 13 illustrates a process for allocating entries in the dispatch table according to miranda method protocol (814) discussed above with respect to FIG. 8.

The miranda method protocol (814) begins by determining whether there are any unprocessed superinterfaces of class C (1302). If there are no unprocessed superinterfaces of class C, then the process 814 is done. If there are any unprocessed superinterfaces, the next interface I is selected (1304). For this interface I, the process 814 will iterate through each method of interface I (1306). If there are no unprocessed methods of interface I then the process returns to determining whether there are any unprocessed superinterfaces of class C (1302). Otherwise, the next method of interface I is retrieved and a check is performed to determine if a same version of the same method of interface I already exists in the dispatch table for class C (1310). If a version of the same method of interface I does exist in the dispatch table, the process continues to iterate through the remaining methods of interface I (1306). If the same version of the method of class C does not exist, a new entry is made for the dispatch table for class C (1312). A pointer is inserted into the new entry of the dispatch table (1314) and the process continues to iterate through the remaining methods of interface I (1306).

To build the dispatch table, a variety of procedures may be implemented. For example, a conventional dispatch table building process may be used with slight modifications to each step. In this conventional process, the size of the superclass in the dispatch table is first determined. From this inherited size, each of the locally defined methods in class C is provided a new entry. New entries are cumulatively counted and added to the size of the inherited superclass dispatch table. Finally, any miranda methods may be processed to complete construction of the dispatch table.

As the present invention permits multiple accessibility designations, separate searches up at least a portion of the superclass and superinterface hierarchy may be performed for each accessibility. Preferably, a search up the ascendant hierarchy for a particular accessibility may cease when it has been found in a superclass.

Additionally, each of the multiple entries for a particular method may be assigned a priority. Typically, the entry having the same accessibility as the accessibility of the method is the primary entry. As the accessibility corresponding to this primary priority may vary based on the method and package, the priority index allows the primary method to be established regardless of the package. A secondary and tertiary entry may additionally exist if found in the ascendant hierarchy corresponding to the other accessibilities and may be assigned to an entry accordingly.

In practice, only the primary index will be used when the method is called. Thus, the indices corresponding to the secondary and tertiary entries need not be necessarily allocated or permanently kept in the dispatch table and may be allocated or permanently kept as determined by the implementation.

A rationale for establishing a relative priority among the plurality of entries for a single method is that when the primary method is linked there will be no ambiguity as to the accessibility status of the called method since the accessibility of the called method was established upon construction of the entry.

The priority enables the same accessibility designated entry to be used for a class while being sensitive to the need for maintaining the other accessibility designation entries. Thus, new locally defined entries which may not be the primary index called for the class may be properly updated in the class with respect to the remaining hierarchy. A locally defined private method will generally always require a new entry in the Vtable which may be designated as the primary entry for that method. However, other accessible methods (i.e. a public) inherited from a superclass may be overriden and indexed correctly to avoid ambiguity of the two entries with the same method.

The above mentioned process is suitable for assigning multiple entries for a method with respect to distinct accessibility levels. However, the dispatch table construction process 800 requires redundant lookup through the ascendant respective hierarchy for each accessibility.

Figure 14:
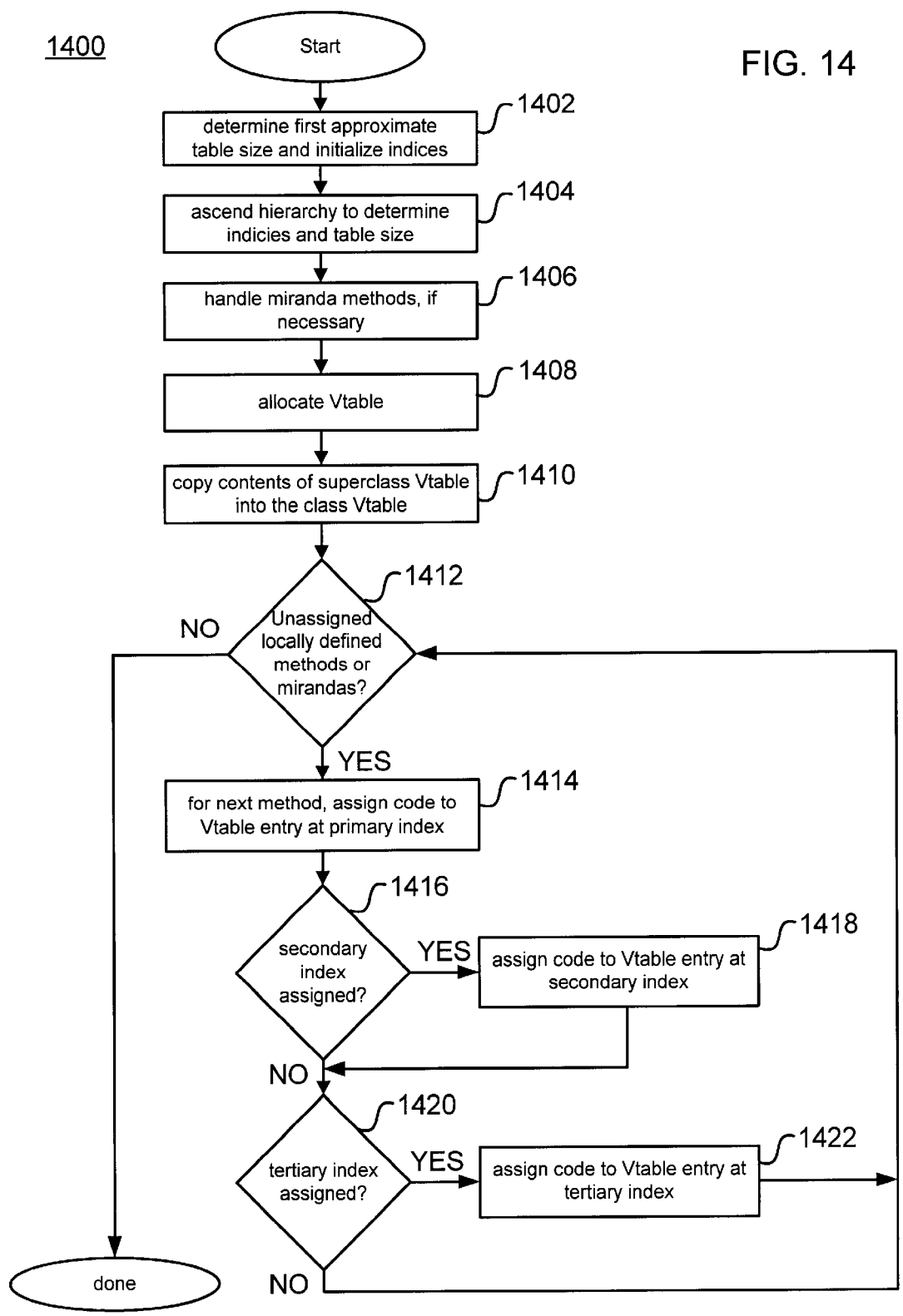
FIG. 14 illustrates a block diagram describing a preferable dispatch table construction process which reduces the amount of lookup in accordance with a preferred embodiment of the present invention.
Figure 15:
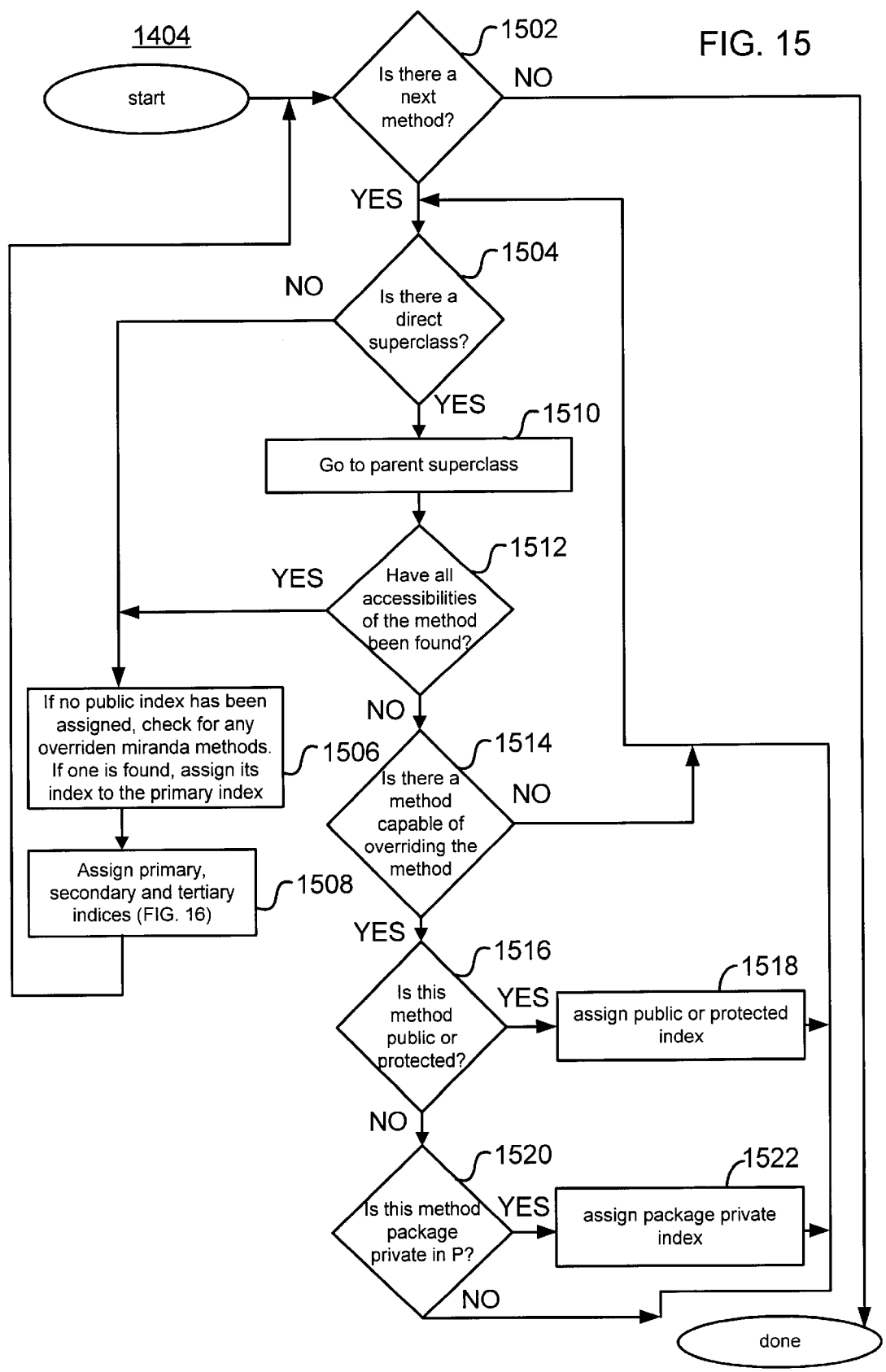
FIG. 15 illustrates a block diagram describing a process for assigning the accessibility indices and incrementing the table size as the lookup proceeds through the ascendant hierarchy as referred to in step 1404 of FIG. 14.
Figure 16:
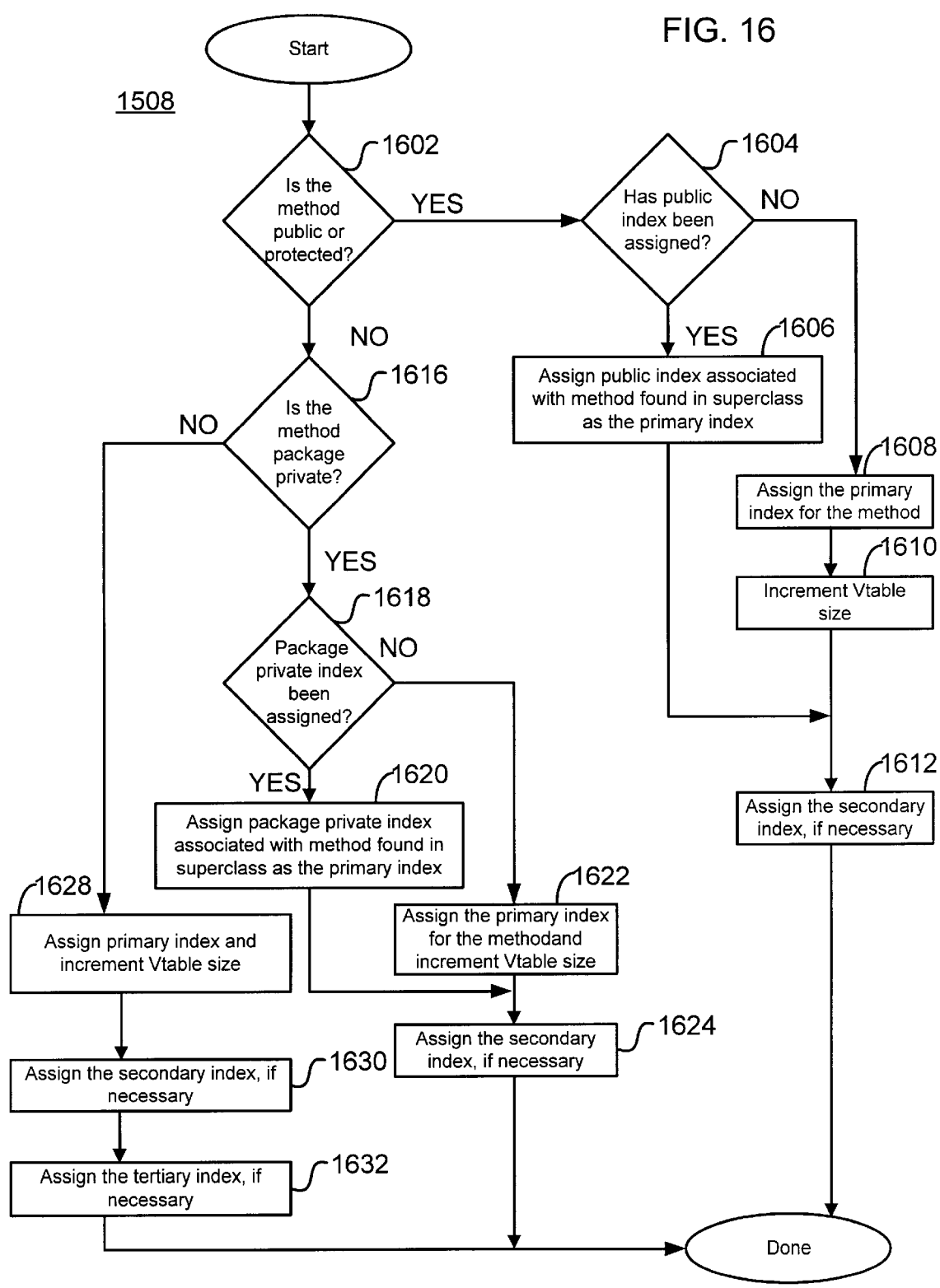
FIG. 16 illustrates a block diagram describing a process for creating the indices in a Vtable after lookup though the ascendant hierarchy.

FIGS. 14–16 illustrate an alternative dispatch table construction process 1400 which reduces the amount of lookup in accordance with another embodiment of the present invention. It also simultaneously determines the size of the dispatch table and what indices are associated with each method in the Vtable. Once this has been performed, the process allocates the Vtable and fills in the appropriate entries. Again, the dispatch table is built for a class C in a package P with a direct superclass S. The dispatch table construction process 1400 differs from the previous example since it determines an index for each accessibility of method M in one traversal of the class and interface hierarchy while simultaneously determining the size of the Vtable.

The dispatch table construction process 1400 (FIG. 14) begins with estimating the initial size of the Vtable which at first approximation is the size of the superclass' Vtable (1402). The dispatch table construction process 1400 also initializes at least one index used in determining whether a particular accessibility has been found in the ascendant hierarchy.

As opposed to the previous case in which one index was used to determine whether the method M was found in the ascendant hierarchy, the dispatch table construction process 1400 uses multiple indices. For example, an accessibility index specifically associated with public accessibility for the method may be maintained independently from an accessibility index specifically associated with package private accessibility while scanning the ascendant hierarchy. In addition, any accessibility indices may begin at a default value (e.g., a negative number) that indicates that a particular method has not been found in the ascendant hierarchy. The index may then change to a second value (a positive number) that indicates the position of the corresponding method.

Assigning the accessibility indices (1404) and incrementing the table size as the lookup proceeds through the ascendant hierarchy is illustrated in FIG. 15 as discussed above with respect to FIG. 14. The process iterates for each locally defined method M in class C (1502). If all the locally defined methods have been processed, then the method returns to preferred dispatch table construction process 1400 (1408). For the next unprocessed method M, a traversal up the ascendant hierarchy is performed which searches for the corresponding method M. This begins by determining whether there is a direct superclass S (1504).

If there is a direct superclass S, the dispatch table construction process 1400 checks the status of the accessibility indices to determine if all the relevant accessibility possibilities of the method M have been found. For example, if all of the accessibility indices corresponding to a public/protected and package private version of the method indicate a presence of the method in the ascendant hierarchy (1512), then the process may proceed to assigning the retrieved information (1506). If all of the accessibility indices corresponding to a public, private and package private version of the method have not been found, then the preferred process 1400 continues to ascend the hierarchy (1504).

The dispatch table construction process 1400 then determines whether the current superclass S contains a method overriden by method M (1514–1520). If such a method not does exist, then the process 1400 is finished with the current superclass S and returns to determine if there is another superclass in the hierarchy (1504). If it does contain a method overriden by method M, then the accessibility of the method needs to be determined. If the overriden method is public or protected (1516), then the primary Vtable index for the method is assigned to the public/protected index (1518). Alternately, if the overriden method is private (1520), then the primary Vtable index for the method will be assigned to the package private index (1522). In either case, the process 1400 continues to ascend the hierarchy (1504).

Figure 17:
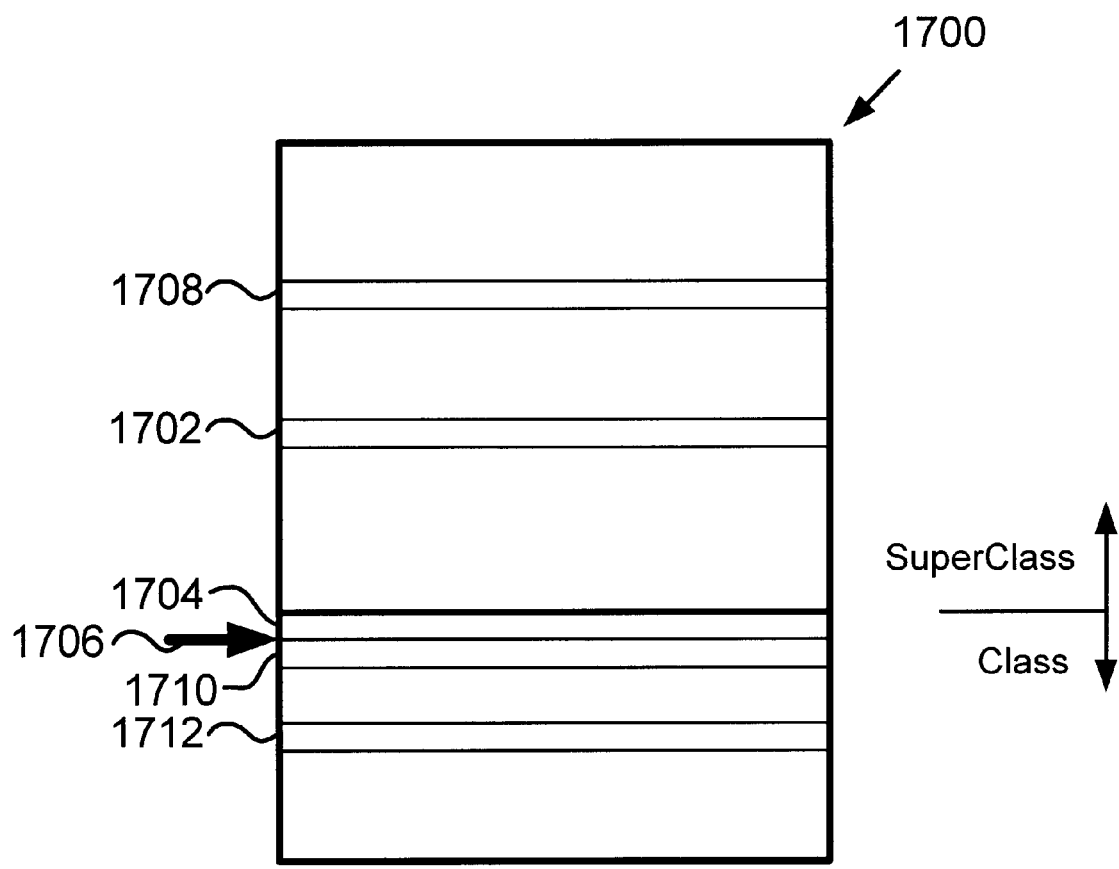
FIG. 17 illustrates a Vtable in accordance with one embodiment of the present invention.

When the all the accessibility types of method M have been found or the lookup through the ascendant hierarchy is complete, the information is assigned to the Vtable (1506). Creating the indices in a Vtable 1700 after lookup though the ascendant hierarchy is illustrated in FIGS. 16 and 17. The creation of the indices for the Vtable 1700 is sensitive to the accessibility of the method M. Correspondingly, the process of assigning an index for the method M first determines the accessibility of the method M.

In this embodiment, it is first determined if the method M is public or protected (1602). If the method M is public or protected, the accessibility index is checked to determine if a public version of the method M has been found in the ascendant hierarchy (1604). If the public or protected method M has been found in the ascendant hierarchy, then the primary Vtable index assigned to method M will be the public/protected accessibility index 1702 found in the superclass (1606). If the public or protected method M has not been found in the ascendant hierarchy, then a new entry 1704 is produced in the Vtable 1700, the primary index for the method M is assigned (1608) to the new entry 1704, and the current Vtable size is incremented (1610) using a Vtable pointer 1706. Thus, regardless of whether the method M was found in the ascendant hierarchy, the primary Vtable index has been assigned in the Vtable 1700.

The Vtable pointer 1706 will then point to a next entry 1710 in the Vtable 1700. The Vtable pointer 1706 began at the estimated size and position corresponding to the inherited methods of the superclass S. As each new entry is added for a locally defined method of class C, the Vtable pointer 1706 increments and maintains the size of the Vtable 1700.

Next, if a package private accessibility index has been recorded, it must be assigned to the secondary index. The assigned index is later used to over-write the appropriate entry in the superclass portion of the Vtable 1700.

If the method M is package private (1616), the accessibility index is checked to determine if the method M has been found in the ascendant hierarchy (1618). If the package private method M has been found in the ascendant hierarchy, then the primary Vtable index assigned to method M will be the package private accessibility index 1708 found in the superclass (1620). If the package private method M has not been found in the ascendant hierarchy, then the new entry 1704 for method M is still produced in the Vtable 1700, the primary index for the method M is assigned (1622) to the new entry 1704, and the current Vtable size is incremented using the Vtable pointer 1706.

Again, if a public/protected index has been recorded, it must be assigned to the secondary index. The assigned index is later used to over-write the appropriate entry in the superclass portion of the Vtable 1700.

Finally, for the preferred process 1400, if the method M is not public, protected or package private, it must be being private (1616). As a locally defined private method will always require a new entry, the new entry for method M 1704 is produced in the Vtable 1700, the primary index for the method M is assigned (1628) to the new entry 1704, and the current Vtable size is incremented using the Vtable pointer 1706.

Next, if a public/protected accessibility index has been recorded, it must be assigned to the secondary index. The assigned index is then used to over-write the appropriate entry in the superclass portion of the Vtable 1700. Similarly, if a package private index has been recorded, it must be assigned to the tertiary index. The assigned index is then used to over-write the appropriate entry in the superclass portion of the Vtable 1700.

After assignment of the indices for all the locally defined methods has been completed and the size of the table is determined (1404), the preferred process 1400 then handles any miranda methods if necessary (1406). The Vtable 1700 is then allocated to a suitable portion of memory (1408). The Vtable 1700 is first filled by the contents of the superclass S (1410) and then by each locally defined method (1412).

For each locally defined method M, the preferred process 1400 assigns the pointer to the corresponding method source code at the primary index (1414). If a secondary index has been assigned (1416), then the pointer to the source code at the secondary index is assigned (1418). Likewise, if a tertiary index has been assigned (1420), then the pointer to the source code at the tertiary index is assigned (1422).

When a subclass implements a miranda method, the corresponding Vtable entry must be updated. Therefore, it must be separately determined if any miranda methods have been over-written. This is performed by searching through the superclasses' Vtable. More specifically, the Vtable is scanned from the bottom looking for miranda methods that match the name and descriptor of the current method. An entry 1712 corresponding to a miranda method is shown in the Vtable 1700.

The procedure for allocating entries for new miranda methods is similar to FIG. 13. In this case however, instead of allocating a new entry in the dispatch table (1302) and inserting a stub pointer into the new entry (1314), a new stub method is added to the set of locally defined miranda methods. A primary index is assigned for this method and the Vtable size is incremented.

In a particular embodiment, the above described Vtable building methods are implemented in the class representation of SUN microsystem's Hotspot's internal class representation. In this case, every class and interface has a method table containing all the methods it locally defines. In addition, every class has a dispatch table that has entries for all methods that can be invoked on an instance of the class (including inherited methods).

The present invention may employ various computer-implemented operations involving information stored in computer systems. These operations include, but are not limited to, those requiring physical manipulation of physical quantities Usually, though not necessarily, these quantities take the form of electrical or magnetic signals capable of being stored, transferred, combined, compared, and otherwise manipulated. The operations described herein that form part of the invention are useful machine operations. The manipulations performed are often referred to in terms such as, producing, identifying, running, determining, comparing, executing, downloading, or detecting. It is sometimes convenient, principally for reasons of common usage, to refer to these electrical or magnetic signals as bits, values, elements, variables, characters, or the like. It should remembered, however, that all of these and similar terms are to be associated with the appropriate physical quantities and are merely convenient labels applied to these quantities.

The present invention also relates to a device, system or apparatus for performing the aforementioned operations. The system may be specially constructed for the required purposes, or it may be a general purpose computer selectively activated or configured by a computer program stored in the computer. The processes presented above are not inherently related to any particular computer or other computing apparatus. In particular, various general purpose computers may be used with programs written in accordance with the teachings herein, or, alternatively, it may be more convenient to construct a more specialized computer system to perform the required operations.

FIG. 18 is a block diagram of a general purpose computer system 1800 suitable for carrying out the processing in accordance with one embodiment of the present invention. For example, JVM 707, virtual machine 711, or bytecode compiler 703 can run on general purpose computer system 1800. FIG. 18 illustrates one embodiment of a general purpose computer system. Other computer system architectures and configurations can be used for carrying out the processing of the present invention. Computer system 1800, made up of various subsystems described below, includes at least one microprocessor subsystem (also referred to as a central processing unit, or CPU) 1802. That is, CPU 1802 can be implemented by a single-chip processor or by multiple processors. CPU 1802 is a general purpose digital processor which controls the operation of the computer system 1800. Using instructions retrieved from memory, the CPU 1802 controls the reception and manipulation of input information, and the output and display of information on output devices.

CPU 1802 is coupled bi-directionally with a first primary storage 1804, typically a random access memory (RAM), and uni-directionally with a second primary storage area 1806, typically a read-only memory (ROM), via a memory bus 1808. As is well known in the art, primary storage 1804 can be used as a general storage area and as scratch-pad memory, and can also be used to store input data and processed data. It can also store programming instructions and data, in addition to other data and instructions for processes operating on CPU 1802, and is typically used for fast transfer of data and instructions bi-directionally over memory bus 1808. Also, as is well known in the art, primary storage 1806 typically includes basic operating instructions, program code, data and objects used by the CPU 1802 to perform its functions. Primary storage devices 1804 and 1806 may include any suitable computer-readable storage media, described below, depending on whether, for example, data access needs to be bi-directional or uni-directional. CPU 1802 can also directly and very rapidly retrieve and store frequently needed data in a cache memory 1810.

A removable mass storage device 1812 provides additional data storage capacity for the computer system 1800, and is coupled either bi-directionally or uni-directionally to CPU 1802 via a peripheral bus 1814. For example, a specific removable mass storage device commonly known as a CD-ROM typically passes data uni-directionally to the CPU 1802, whereas a floppy disk can pass data bi-directionally to the CPU 1802. Storage 1812 may also include computer-readable media such as magnetic tape, flash memory, signals embodied in a carrier wave, Smart Cards, portable mass storage devices, and other storage devices. A fixed mass storage 1816 also provides additional data storage capacity and is coupled bi-directionally to CPU 1802 via peripheral bus 1814. Generally, access to these media is slower than access to primary storages 1804 and 1806. Mass storage 1812 and 1816 generally store additional programming instructions, data, and the like that typically are not in active use by the CPU 1802. It will be appreciated that the information retained within mass storage 1812 and 1816 may be incorporated, if needed, in standard fashion as part of primary storage 1804 (e.g. RAM) as virtual memory.

In addition to providing CPU 1802 access to storage subsystems, the peripheral bus 1814 is used to provide access to other subsystems and devices as well. In the described embodiment, these include a display monitor 1818 and adapter 1820, a printer device 1822, a network interface 1824, an auxiliary input/output device interface 1826, a sound card 1828 and speakers 1830, and other subsystems as needed.

The network interface 1824 allows CPU 1802 to be coupled to another computer, computer network, or telecommunications network using a network connection as referred to. Through the network interface 1824, it is contemplated that the CPU 1802 might receive information, e.g., objects, program instructions, or bytecode instructions from a computer in another network, or might output information to a computer in another network in the course of performing the above-described method steps. Information, often represented as a sequence of instructions to be executed on a CPU, may be received from and outputted to another network, for example, in the form of a computer data signal embodied in a carrier wave. An interface card or similar device and appropriate software implemented by CPU 1802 can be used to connect the computer system 1800 to an external network and transfer data according to standard protocols. That is, method embodiments of the present invention may execute solely upon CPU 1802, or may be performed across a network such as the Internet, intranet networks, or local area networks, in conjunction with a remote CPU that shares a portion of the processing. Additional mass storage devices (not shown) may also be connected to CPU 1802 through network interface 1824.

Auxiliary I/O device interface 1826 represents general and customized interfaces that allow the CPU 1802 to send and, more typically, receive data from other devices. Also coupled to the CPU 1802 is a keyboard controller 1832 via a local bus 1834 for receiving input from a keyboard 1836 or a pointer device 1838, and sending decoded symbols from the keyboard 1836 or pointer device 1838 to the CPU 1802. The pointer device may be a mouse, stylus, track ball, or tablet, and is useful for interacting with a graphical user interface.

In addition, embodiments of the present invention further relate to computer storage products with a computer readable medium that contain program code for performing various computer-implemented operations. The computer-readable medium is any data storage device that can store data which can thereafter be read by a computer system. Examples of computer-readable media include, but are not limited to, all the media mentioned above, including hard disks, floppy disks, and specially configured hardware devices such as application-specific integrated circuits (ASICs) or programmable logic devices (PLDs). The computer-readable medium can also be distributed as a data signal embodied in a carrier wave over a network of coupled computer systems so that the computer-readable code is stored and executed in a distributed fashion.

It will be appreciated by those skilled in the art that the above described hardware and software elements are of standard design and construction. Other computer systems suitable for use with the invention may include additional or fewer subsystems. In addition, memory bus 1008, peripheral bus 1814, and local bus 1834 are illustrative of any interconnection scheme serving to link the subsystems. For example, a local bus could be used to connect the CPU to fixed mass storage 1816 and display adapter 1820. The computer system referred to in FIG. 18 is but an example of a computer system suitable for use with the invention. Other computer architectures having different configurations of subsystems may also be utilized.

Although the foregoing invention has been described in some detail for purposes of clarity of understanding, it will be apparent that certain changes and modifications may be practiced within the scope of the appended claims. For example, although invention has been discussed with respect to building a dispatch table for a class, a dispatch table may be similarly built with the disclosed procedures for an interface. In another example, static methods and processes of differentiating them with respect to Vtables has not been expanded upon but the invention is applicable to separating them as well. In addition, as an optimization, allocating a Vtable entry to a final method can be avoided unless it overrides a method in a superclass or superinterface. Moreover, it should be noted that although the present invention has been illustrated with only four accessibilities, more are obviously possible and applicable to the present invention. Furthermore, it should be noted that there are alternative forms of dispatch table construction conflicts and resolutions not addressed that the present invention is flexibly able to adapt to. Accordingly, the present embodiments are to be considered as illustrative and not restrictive, and the invention is not to be limited to the details given herein, but may be modified within the scope and equivalents of the appended claims.

What is claimed is:

1. A process of building a dispatch table for methods in a first class that inherits from a directsuperclass, the process comprising:

copying a dispatch table from the direct superclass;

determining whether a selected method in the first class also exists in an ancestor superclass of the first class;

when it is determined that the selected method also exists in the ancestor superclass, determining whether the ancestor superclass version of the selected method is accessible;

when it is determined that the ancestor superclass version of the selected method is not accessible, creating a new entry in the dispatch table for the selected method in the first class; and when it is determined that the selected method in the first class is accessible, overwriting an entry.

2. The method of claim 1 further including inheriting a method from at least one superinterface.

3. The method of claim 2 wherein the entry created is a miranda method.

4. The method of claim 1 wherein the process of building the dispatch table is implemented by an object oriented language.

5. The method of claim 4 wherein the object oriented language is JAVA.

6. The method of claim 1 wherein the entry or the new entry further include an index.

7. The method of claim 1 wherein the class belongs to a package.

8. The method of claim 1 wherein the version of the method further includes one of a public accessibility, private accessibility, protected accessibility and package private accessibility.

9. A process of building a dispatch table for methods in a first class that inherits from a direct superclass in an ascendant hierarchy, the process comprising:

copying a dispatch table from the direct superclass;

determining whether a selected method and an accessibility in the first class also exists in a superclass of the ascendant hierarchy;

for each accessibility, when it is determined that the selected method and the accessibility also exist in the superclass of the ascendant hierarchy, assigning an index of the dispatch table to the method and accessibility; and assigning an entry in the dispatch table to each index assigned to the selected method and the accessibility.

10. The method of claim 9 further including assigning a priority in the dispatch table for each entry assigned to the selected method and the accessibility.

11. The method of claim 10 wherein a primary priority is assigned to the entry corresponding to the selected :method and the accessibility corresponding to the accessibility of the first class.

12. The method of claim 9 further including ceasing determining whether the selected method and the accessibility in the first class also exists in a superclass of the ascendant hierarchy when all the accessibilities of the method have been assigned an index.

13. The method of claim 9 wherein the accessibility of a method is a public accessibility, a private accessibility, a protected accessibility or a package private accessibility.

14. The method of claim 9 wherein determining whether the selected method and the accessibility in the first class also exists in a superclass of the ascendant hierarchy is performed using an index which changes from a first state when the selected method and an accessibility have not been found to a second state when the selected method and an accessibility have been found.

15. The method of claim 9 further including determining the size of the Vtable.

16. The method of claim 15 further including allocating at least one entry of the Vtable corresponding to each assigned entry.

17. The method of claim 16 further including filling in the Vtable.

18. A computer program product for building a dispatch table for methods in a first class that inherits from a superclass, comprising:

a computer code that copies a dispatch table for a superclass;

a computer code that determines whether a selected method in the first class also exists in an ancestor superclass of the first class;

a computer code that, when it is determined that the selected method also exists in an ancestor. superclass that the first class inherits from, determines whether a selected superclass version of the selected method is accessible;

a computer code that, when it is determined that the selected superclass version of the selected method is not accessible, creates a new entry in the dispatch table for the selected method in the first class; and a computer code that, when it is determined that the selected method in the first class is accessible, overwrites an entry.

* * * * *